Dec. 29, 1953   R. C. FERGASON   2,663,983
CORN HARVESTER
Original Filed June 15, 1942   10 Sheets-Sheet 2
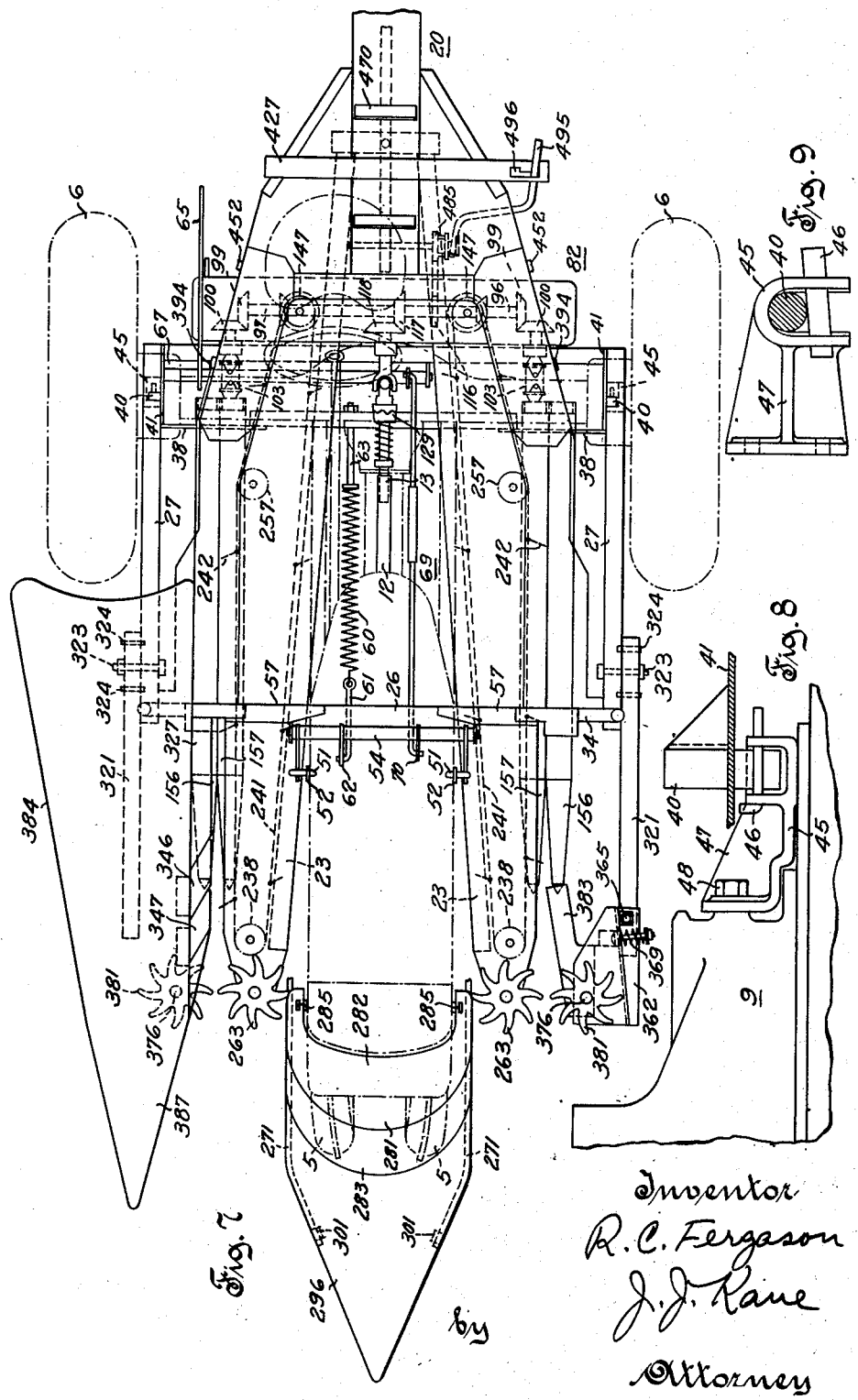

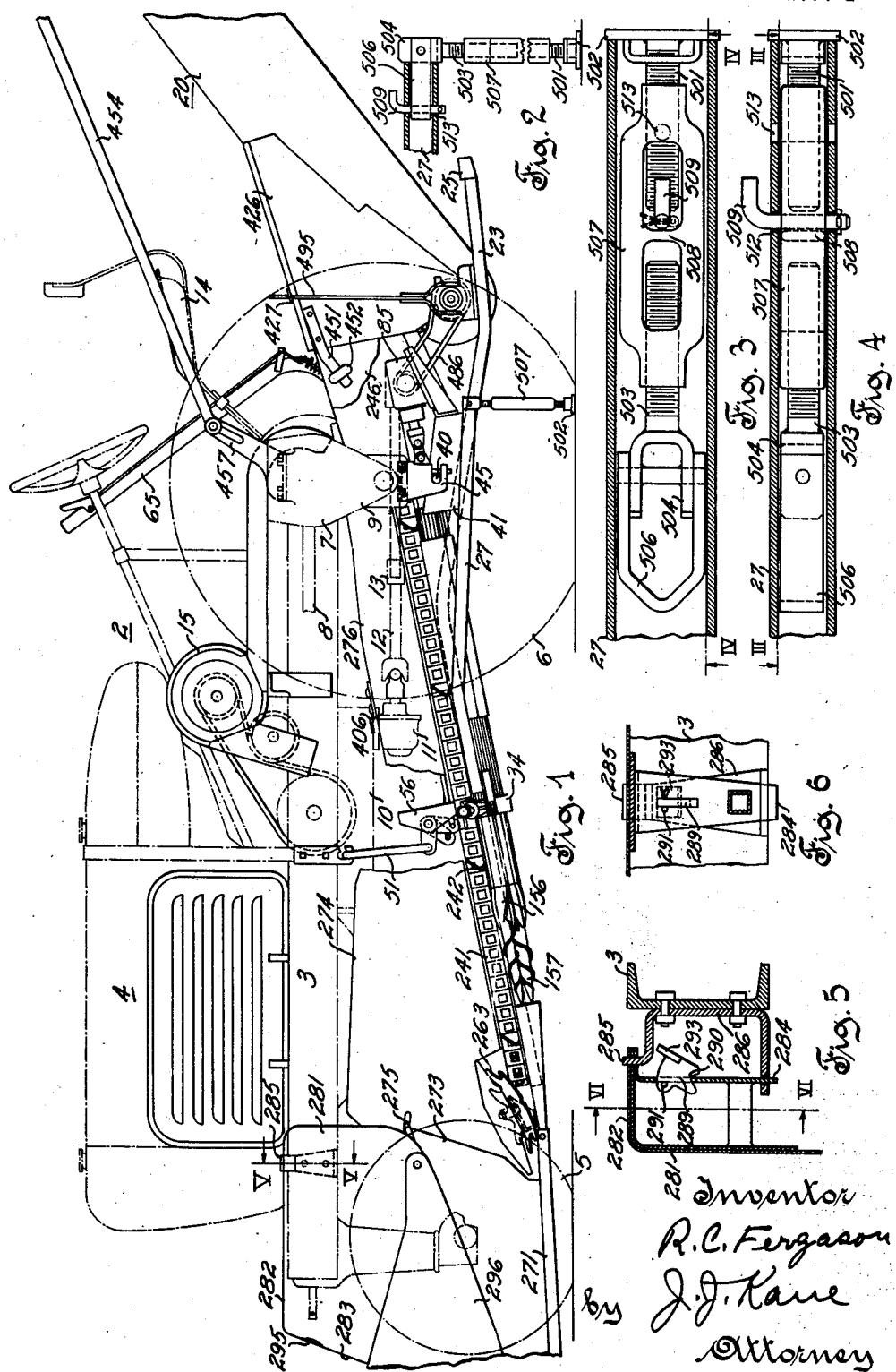

Dec. 29, 1953   R. C. FERGASON   2,663,983
CORN HARVESTER
Original Filed June 15, 1942   10 Sheets-Sheet 3
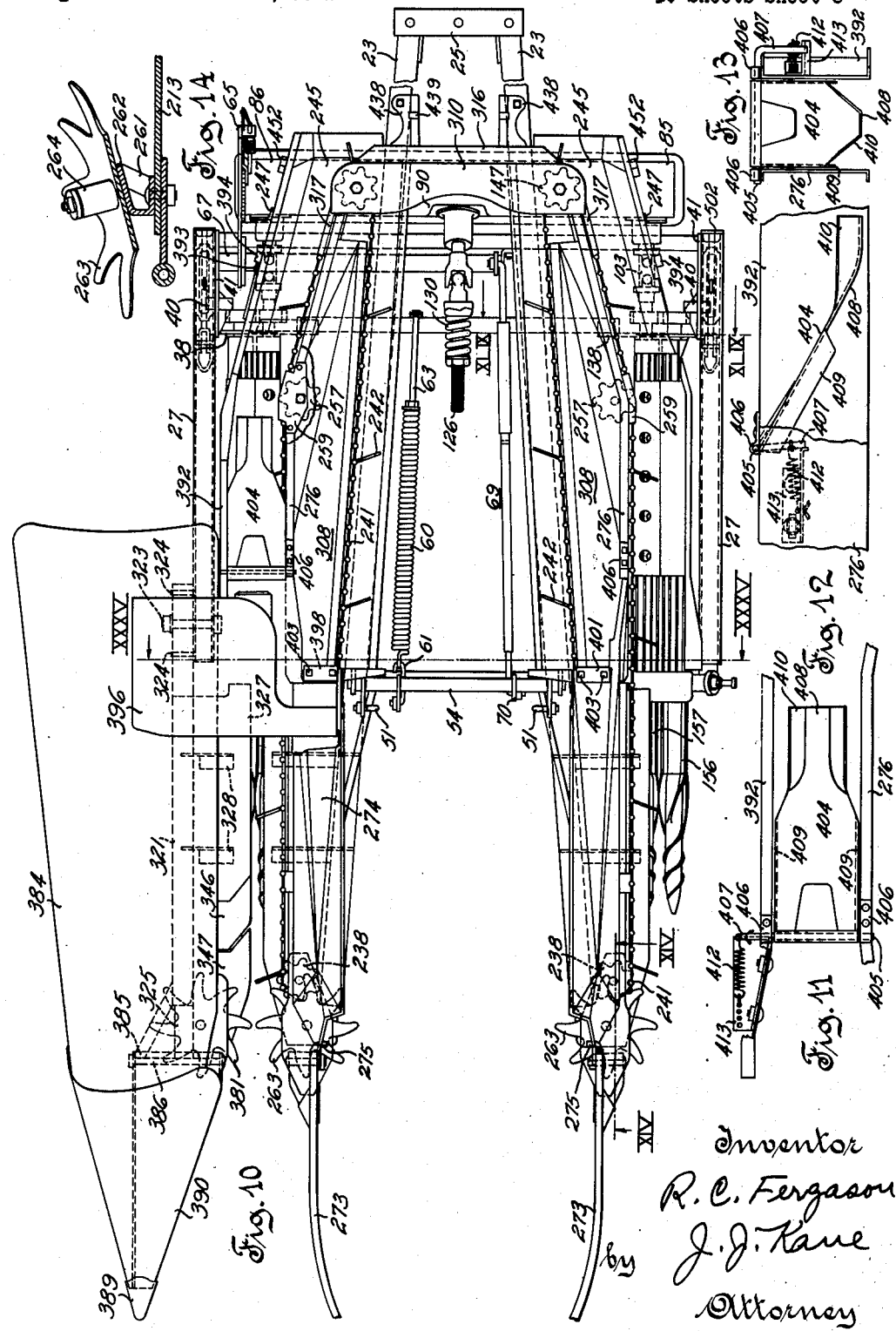
Inventor
R. C. Fergason
J. J. Kane
by
Attorney

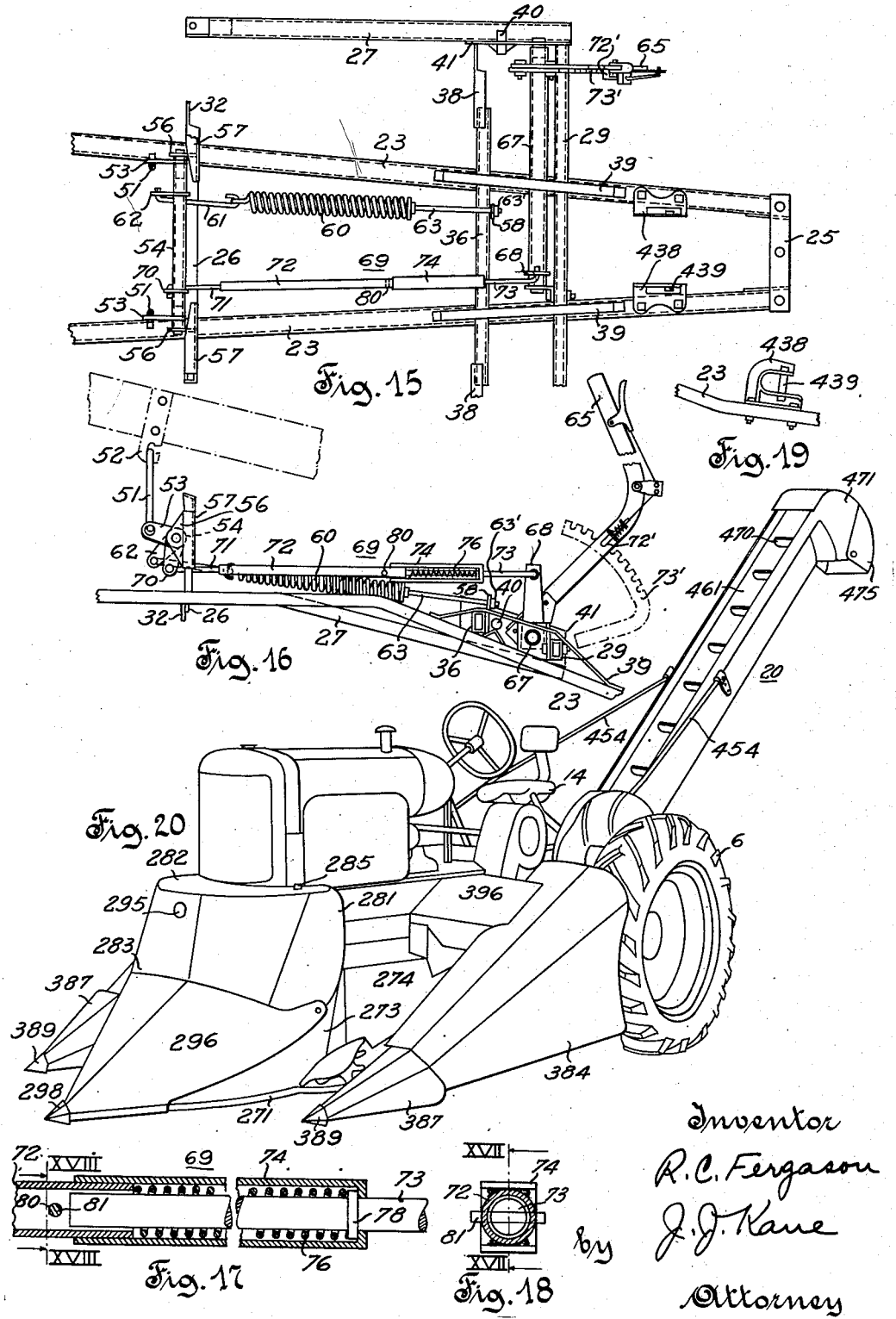

Dec. 29, 1953     R. C. FERGASON     2,663,983
CORN HARVESTER
Original Filed June 15, 1942     10 Sheets-Sheet 5
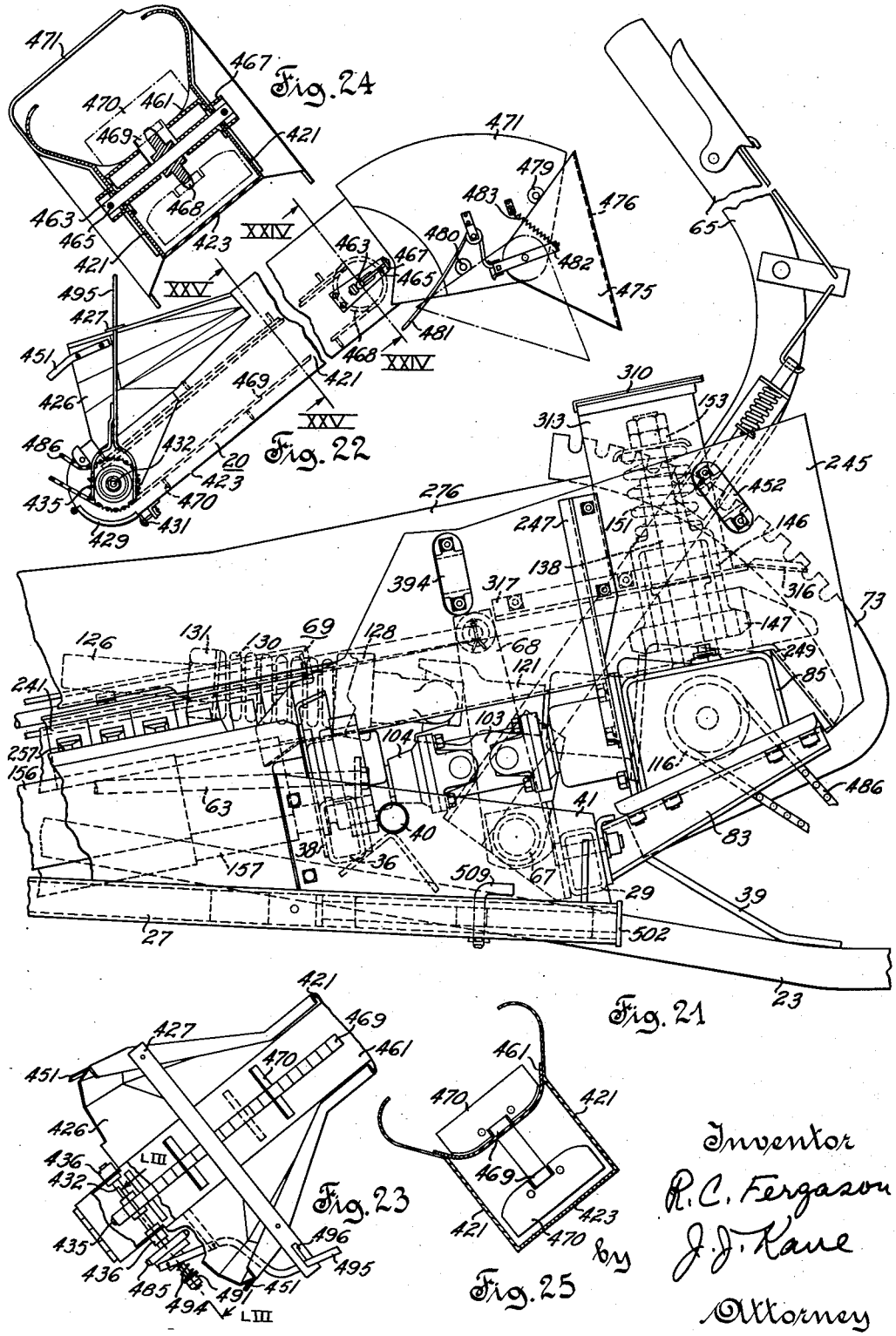

Dec. 29, 1953     R. C. FERGASON     2,663,983
CORN HARVESTER
Original Filed June 15, 1942     10 Sheets-Sheet 6
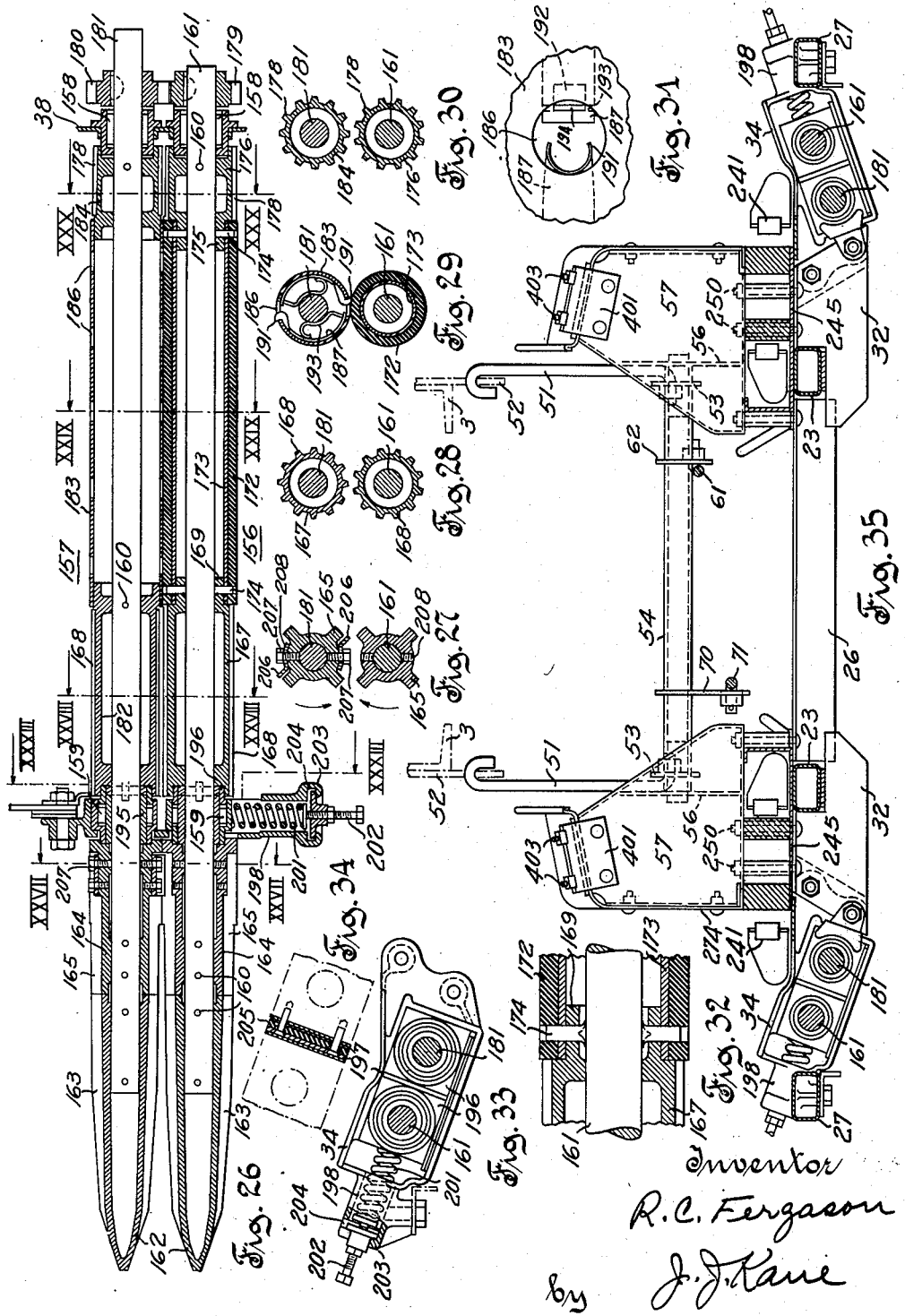
Inventor
R. C. Fergason
by J. J. Kane
Attorney

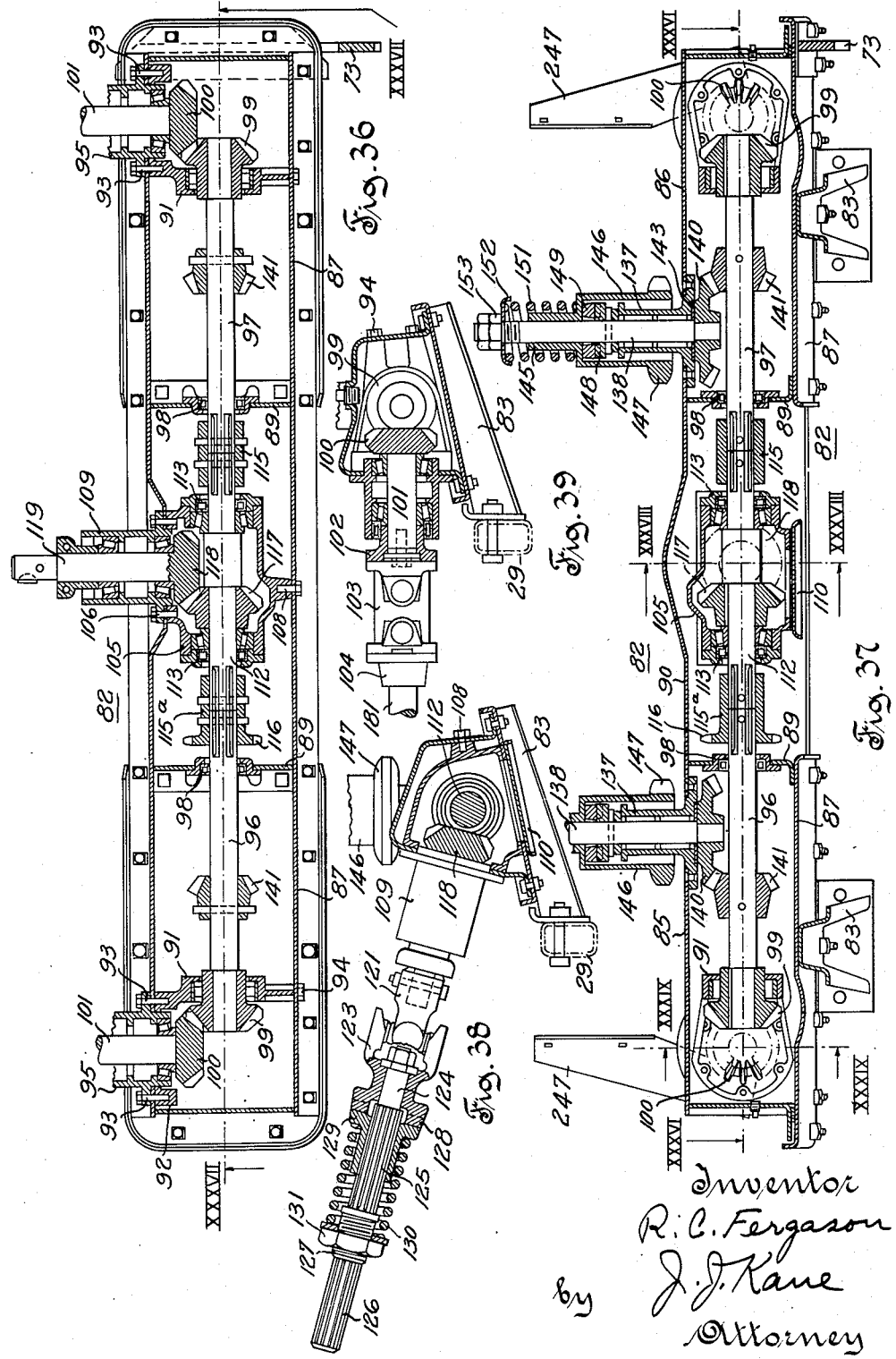

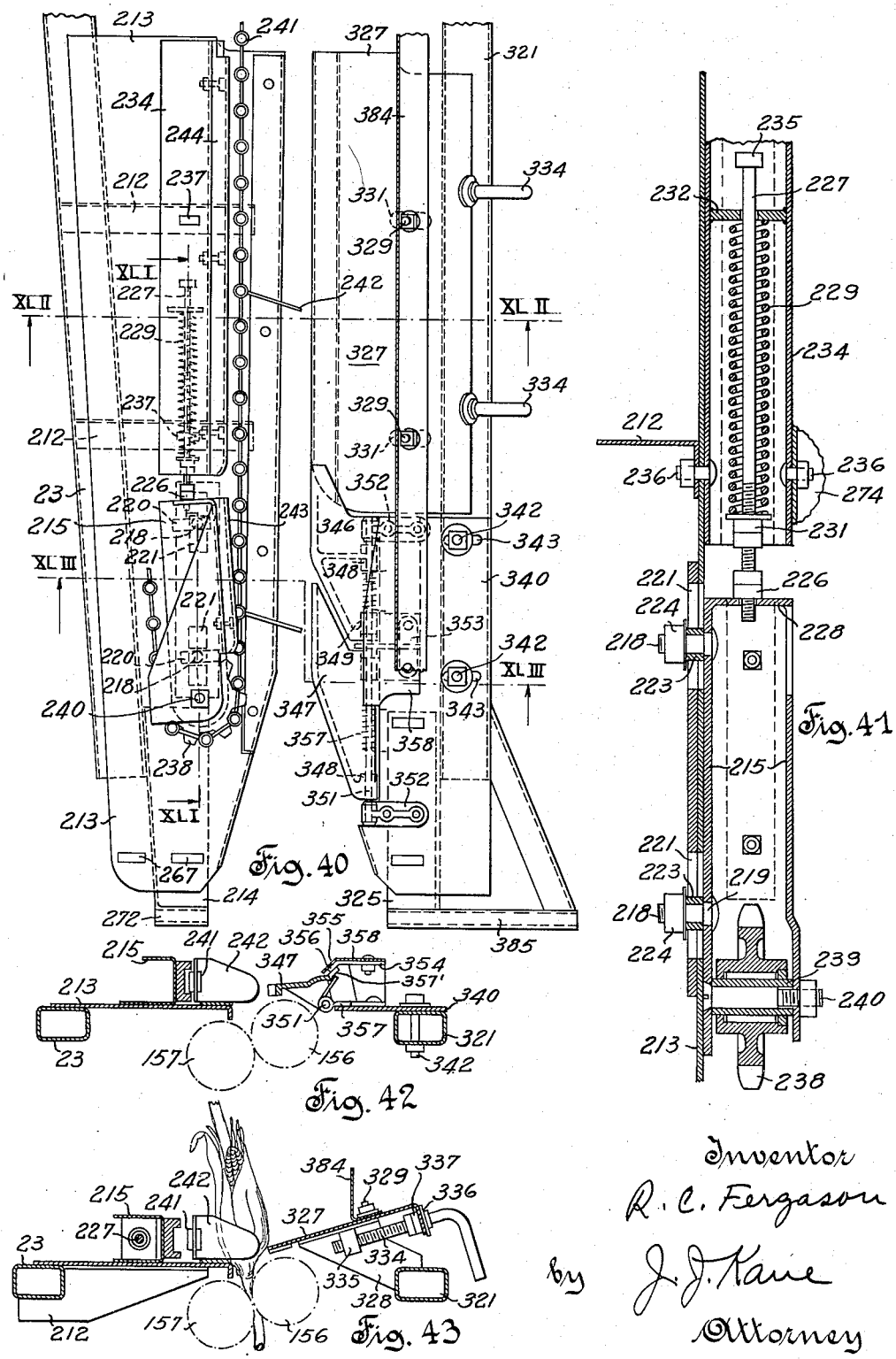

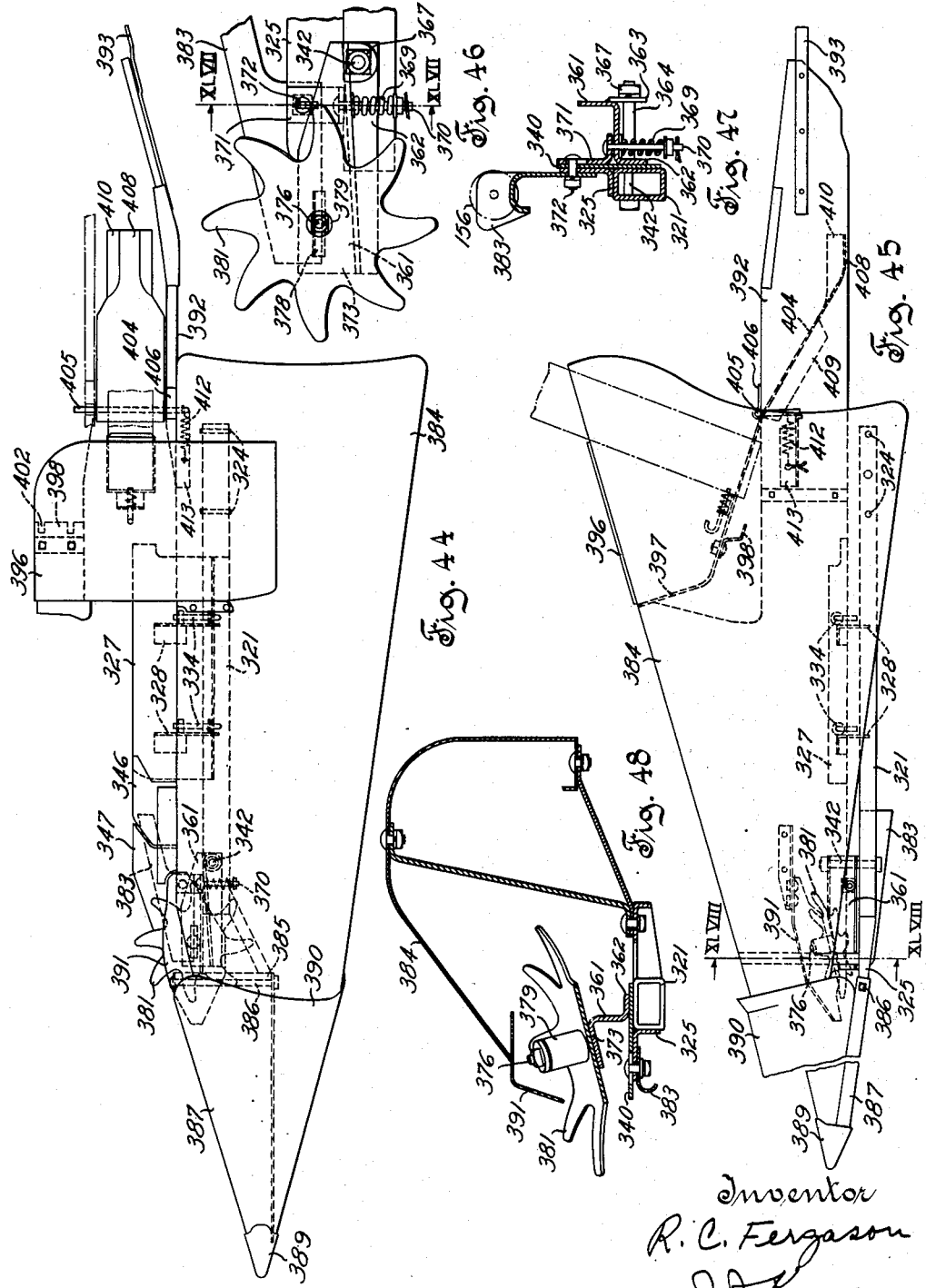

Dec. 29, 1953          R. C. FERGASON          2,663,983
CORN HARVESTER
Original Filed June 15, 1942          10 Sheets—Sheet 10
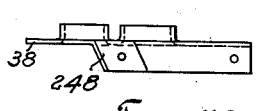
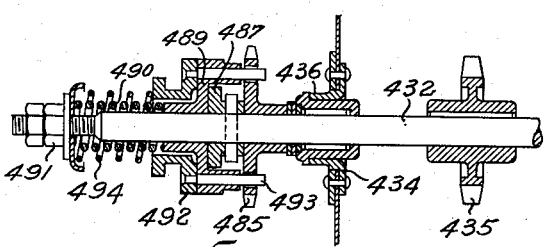
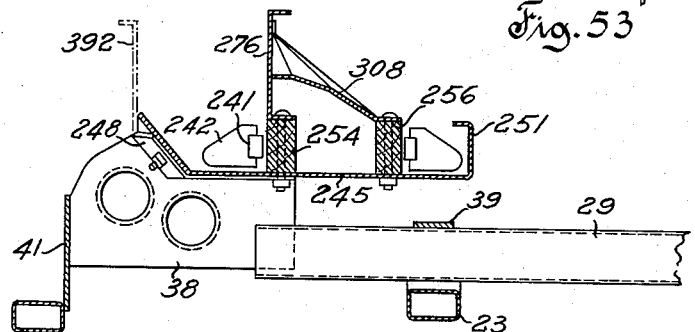
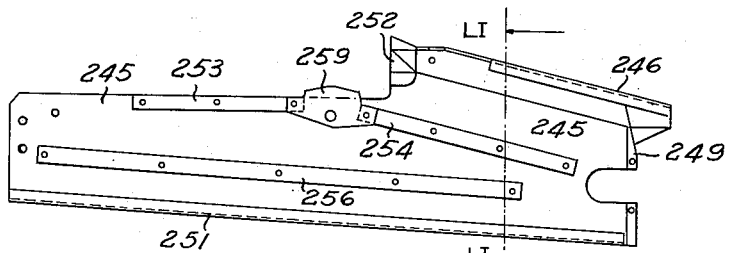
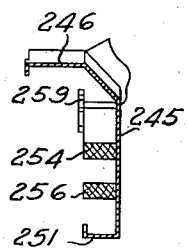
Inventor
R. C. Fergason
by J. J. Kane
Attorney

Patented Dec. 29, 1953

2,663,983

UNITED STATES PATENT OFFICE 2,663,983

CORN HARVESTER

Rector C. Fergason, Gadsden, Ala., assignor to Allis-Chalmers Manufacturing Company, Milwaukee, Wis., a corporation of Delaware Continuation of application Serial No. 447,025, June 15, 1942. This application August 18, 1949, Serial No. 111,057

35 Claims. (Cl. 56—18)

This application is a continuation of my copending application Serial No. 447,025, filed June 15, 1942, now abandoned, and the invention relates in general to agricultural implements, and has more particular relation to corn harvesters, especially such as are of the type designed for mounting on a tractor wherein the latter serves not only as a means for propelling the implement through the field, but also as a support or carrier for the implement, and wherein the harvester, during its travel through the field, picks the ears of corn from the standing stalks and preferably removes the husks from the picked ears and conveys the latter to a suitable point of collection.

Tractor mounted corn harvesters have been in commercial production and use for a considerable time past, but commercial forms of such harvesters have heretofore been relatively cumbersome and heavy, with consequent necessity of a tractor of relatively high power and hence high cost and power consumption, and expensive for the farmer to own and operate, as well as requiring relatively considerable time and labor in assembling the harvester on the tractor and removing it therefrom when it is desired to use the tractor for other farm purposes. A very considerable disadvantage of various present commercial forms of corn harvesters is the fact that much of the essential operating mechanism of the harvester, when mounted on a tractor, is disposed at a relatively high point off the ground and restricts the quarters of the tractor operator and obstructs his view of the crop to be harvested, as well as placing the operator in a position very close to operating parts of the harvester mechanisms, with consequent hazard of injury therefrom. And also, because of the relatively great weight and relatively high center of gravity of the mounted harvester, the effect of travel over the relatively rough ground of the field is such as to induce increased wear on shaft bearings and connections between the parts of the mechanism, and thus generally to reduce the useful life of the harvester.

The present invention is directed toward and contemplates avoiding or minimizing these and other disadvantages of present commercial forms of such farm implements, and the production of a corn harvester of such simple design and construction, reduced number of parts and lightweight, as results in reduced initial cost to the farmer and reduced costs of operation, and embody features which provide for efficient operation and increased comfort and safety of the operator, with improved vision of the crop and the operation of the machine, and which facilitate ready assembling of the harvester on the tractor and removal therefrom in minimum time.

Particularly desirable results and advantages are attained in a corn harvester embodying the present invention through features of design directed toward the production of a harvester of reduced weight and overall height wherein all of the essential parts of the harvester and drives therefor may be mounted on a common frame suspended from the tractor at a low point, to produce what may be termed an underslung arrangement of the harvester, wherein the parts thereof will not constitute obstruction to the vision of the tractor operator or injury hazard to him.

In the attainment of certain desirable results and advantages in a corn harvester embodying the present invention, the snapping rolls, and preferably the husking rolls, are disposed mainly forwardly of the tractor rear axle and at such low elevation that the necessary devices for conveying corn from the rolls may pass beneath the rear axle of the tractor to a point of collection to the rear thereof, with the rolls and conveyers assembled on a unitary frame pivotally mounted on the tractor in a simple manner to permit vertical adjustment of the forward end of the frame and parts carried thereby.

Additional advantages are attainable in accordance with this invention through providing harvesting rolls and operative mountings therefor of improved design and construction and mounting, insuring highly desirable harvesting effects with respect to efficient snapping of the corn from the stalks and removal of husks from the picked ears.

Additional advantages of the present invention are concerned with the provision of a conveyer mechanism of improved design and utilizing a single movable conveying element effectively disposed with respect to the harvesting rolls, for gathering the corn stalks into picking relation with respect to the rolls, and conveying picked corn over the husking rolls, and conveying the husked corn to a point of collection at the rear of the tractor.

Further advantages of this invention are concerned with the provision of an improved design of harvester rolls, embodying forward picking or snapping sections and rearward husking sections aligned with the picking sections, and preferably mounted on the same shaft therewith.

A further advantage of this invention is concerned with the provision of cooperative husking rolls of improved design wherein provisions are made for effectively presenting the picked corn to yieldable husking points of improved design carried by one of the husking rolls for facilitating removal of the husks; and an additional advantage is concerned with the provision of an improved device for yieldingly pressing picked ears onto the husking rolls without interference with the movable conveying element.

Further advantages of this invention are concerned with the provision of devices of improved design and construction for guiding the standing corn stalks into effective snapping relation with respect to the rolls, and for lifting down stalks and ears into position where they are effectively carried into desired operative relation with respect to the rolls.

Further advantages of this invention are concerned with the provision of devices of improved design and construction and association with the harvester rolls for preventing passage of the ears of corn into a position where they may be injured by the snapping rolls.

A further feature of advantage of this invention is concerned with the provision of a harvester of such design that the essential operative parts thereof are mounted on a unitary frame over which a tractor may be driven, and when the latter is in suitable position for attaching, the harvester as a unit may be readily connected in operative position on the tractor with a minimum of operations and time spent.

Further advantages of this present invention are concerned with the provision of an improved power drive for the harvester and mounted on the harvester frame and providing for the operation of the various harvester mechanisms through a detachable driving connection of a single driving element carried by the harvester frame to a power take-off connection on the tractor.

Further advantages of this invention are concerned with the provision of an improved power drive mounted on the harvester frame for driving the various operating mechanisms of the harvester and wherein the essential geared drives are mounted in a sealed enclosure.

Further advantages of this invention are concerned with the provision of an improved corn harvester for mounting on a tractor and wherein an elevating conveyer for harvested corn is mounted on, and preferably separately detachable from, the harvester frame, and the harvester mechanisms are driven through a driving connection from the power drive on the harvester frame; and additional advantages are concerned with the provision of a simple and improved combined slip and mechanically operated clutching device in the elevator drive.

A further advantage of the invention is concerned with the provision of an improved design of elevator housing and conveyer flights cooperative therewith providing improved efficiency in the matter of saving shelled corn passing along the conveyer.

A further advantage of the invention is concerned with the provision of an improved design of readily detachable suspension for the elevating conveyer attachable to the tractor in a manner providing maximum freedom to the operator and capable of serving as a support for the conveyer in elevated position when the harvester assembly is dismounted from the tractor.

Further advantages of this invention are concerned with the provision of an improved design of center divider and associated shields for a harvester of the two-row type; and additional advantages of the invention are concerned with an improved design of readily removable and replaceable outer shield, and associated parts, for gathering and picking mechanism of the harvester.

A further advantage of this invention is concerned with the provision of an improved design of adjustable supporting jacks normally carried by the harvester frame and movable to a position wherein they provide an adjustable support for the harvester frame on the ground for facilitating mounting of the frame on and dismounting it from the tractor.

Objects of this invention are concerned with provision of a corn harvester and its mounting on a tractor, of such improved design and construction as contribute to the attainment of the aforesaid and other structural and operating advantages, individually and collectively.

These and other objects and advantages are attained by the present invention, various novel features of which will be apparent from the description herein and the accompanying drawings, disclosing an embodiment of features of the invention, and will be more particularly pointed out in the annexed claims.

In the accompanying drawings:

Fig. 1 is a view in side elevation, with parts removed to facilitate illustration, showing a tractor-mounted corn harvester embodying features of the present invention;

Fig. 2 is an enlarged view in elevation, with parts in section, of a detail shown in Fig. 1, and concerned with an auxiliary support for the harvester frame;

Fig. 3 is an enlarged sectional view, partly in plan, in the plane of the line III—III of Fig. 4;

Fig. 4 is a sectional view, partly in elevation, in the plane of the line IV—IV of Fig. 3;

Fig. 5 is a sectional view of a detail, in the plane of the line V—V of Fig. 1;

Fig. 6 is a sectional view, in the plane of the line VI—VI of Fig. 5;

Fig. 7 is a plan view of the harvester, with parts removed, in its relation to the tractor;

Fig. 8 is a rear end view, partly in section, showing a detail of the pivotal mounting of the harvester;

Fig. 9 is a view in elevation of a detail shown in Fig. 8;

Fig. 10 is a plan view of the harvester, with parts removed;

Figs. 11, 12 and 13 are plan, side elevation and rear elevation, respectively, of a detail shown in Fig. 10;

Fig. 14 is a sectional view, with parts removed, in the plane of the line XIV—XIV of Fig. 10;

Figs. 15 and 16 are plan and side elevation, respectively, of a portion of the harvester frame and lifting mechanism;

Fig. 17 is a sectional view, in the plane of the line XVII—XVII of Fig. 18, of a detail shown in Figs. 15 and 16;

Fig. 18 is a sectional view in the plane of the line XVIII—XVIII of Fig. 17;

Fig. 19 is a side elevation of a detail shown in Fig. 15;

Fig. 20 is a perspective view of the harvester mounted on the tractor;

Fig. 21 is a side elevation, with parts removed, of the rear portion of the harvester;

Fig. 22 is a broken side elevation of the elevator conveyer;

Fig. 23 is a plan view of the lower end of the conveyer shown in Fig. 22;

Figs. 24 and 25 are sectional views, in the planes of the lines XXIV—XXIV and XXV—XXV, respectively, of Fig. 22;

Fig. 26 is an enlarged sectional view taken in the common plane of the axes of the harvesting rolls;

Figs. 27, 28, 29 and 30 are sectional views, in the planes of the lines XXVII—XXVII, XXVIII—XXVIII, XXIX—XXIX and XXX—XXX of Fig. 26;

Fig. 31 is an enlarged plan view of a portion of a detail of Fig. 26;

Fig. 32 is an enlarged sectional view, in the same plane as Fig. 26, showing a detail;

Fig. 33 is an enlarged sectional view, in the plane of the line XXXIII—XXXIII of Fig. 26;

Fig. 34 is an enlarged sectional view of a detail of Fig. 33;

Fig. 35 is a sectional view in the plane of the line XXXV—XXXV of Fig. 10;

Fig. 36 is an enlarged substantially horizontal sectional view in the general plane of the line XXXVI—XXXVI of Fig. 37, showing details of the enclosed main drive of the harvester;

Fig. 37 is a sectional view in the plane of the line XXXVII—XXXVII of Fig. 36;

Figs. 38 and 39 are sectional views, in the planes of the lines XXXVIII—XXXVIII and XXXIX—XXXIX of Fig. 37;

Fig. 40 is a plan view, with parts removed, of the forward end of a portion of the harvester;

Fig. 41 is an enlarged sectional view in the plane of the line XLI—XLI of Fig. 40;

Figs. 42 and 43 are sectional views, in the planes of the lines XLII—XLII and XLIII—XLIII, respectively, of Fig. 40 with the rolls shown in dotted lines;

Fig. 44 is an enlarged plan view of one of the removable outer gathering elements of the harvester;

Fig. 45 is an outer side view of one of the elements shown in Fig. 44;

Fig. 46 is an enlarged plan view of a detail shown in Figs. 44 and 45;

Fig. 47 is a sectional view in the plane of the line XLVII—XLVII of Fig. 46;

Fig. 48 is an enlarged sectional view in the plane of the line XLVIII—XLVIII of Fig. 45;

Fig. 49 is a sectional view, with parts removed, in the plane of the line XLIX—XLIX of Fig. 10;

Fig. 50 is a plan view of an element shown in Figs. 10 and 49;

Fig. 51 is a sectional view in the plane of the line LI—LI of Fig. 50;

Fig. 52 is a plan view of a detail shown in Fig. 49; and

Fig. 53 is an enlarged sectional view, in the plane of the line LIII—LIII of Fig. 23.

In the embodiment of the invention illustrated in the drawing, a conventional form of tractor, or other suitable form of mobile frame, is indicated at 2, and includes a supporting frame 3 carrying an engine 4, with conventional control and other accessories. The tractor frame is supported on a pair of steerable front wheels 5 having their axles suitably hung from the frame, and on a pair of traction wheels 6 carried by a rear axle housing 7 supported on or integral with the rear portion of the tractor frame. This rear axle housing is preferably of the drop type wherein the central or intermediate portion encloses a differential drive, driven from the usual transmission shaft 8, and depending side portions 9 of the housing enclose gear connections from the differential drive to the axles of the traction wheels 6. A conventional change-speed transmission 10 provides a variable speed connection from the engine shaft to the transmission shaft 8; and a power take-off connection 11, preferably associated with the transmission 10, serves to drive a power take-off shaft 12 having an internally splined sleeve 13 at its rear end for furnishing power to the various parts of an implement that may be associated with the tractor. An operator's seat 14 is suitably supported on the engine frame or rear axle housing in desired position with respect to the tractors controls. A fan 15 may be mounted on and suitably driven from the tractor engine, for furnishing an air blast to remove loose trash from the tractor and implement parts.

The corn harvester is shown as comprising two units which are similar except as to being left and right, respectively, and each comprising cooperative picking and husking rolls mounted on a supporting frame and disposed at its own side of the tractor frame and with its essential harvesting parts disposed laterally within the tread of the adjacent traction wheel 6, and a conveying device extending rearwardly for conveying husked corn beneath the tractor rear axle housing and depositing it in the forward lower end of an elevating conveyer 20 at the rear of the tractor, along with suitable controls and drives for operating the several mechanisms of the harvester.

As more particularly shown in Fig. 15, the harvester frame comprises two longitudinally extending frame bars 23 inclined away from the center line of the harvester toward their forward ends and having their rear portions downwardly inclined with respect to the forward portions. These bars 23 are connected in spaced relation through a cross bar 25 at their rear end, with their rear portions occupying a position substantially below the intermediate portion of the rear axle housing; and a cross bar 26 rigidly connected to the bars 23 at a forward point. Longitudinally extending frame bars 27 preferably of rectangular tubular form are disposed laterally outside of the bars 23 but at points within the tread of the adjacent traction wheels 6, and their forward portions are in substantially the same horizontal plane as the bars 23 but with their rear ends generally inclined downwardly at a slightly different rate of inclination than the bars 23. The bars 27 are secured in desired assembled relation with respect to the bars 23 by a cross bar 29 connected, directly or through connecting brackets, to rear ends of the bars 27 and to the bars 23. The bars 27 are also connected to the adjacent longitudinal frame bars 23 through brackets 32 rigidly connected to the bars 23 and bearing supports 34 detachably connected to the brackets 32 and to the forward end portion or an extension thereof, of the corresponding bars 27. A cross bar 36 is also rigidly connected, through connecting brackets, to the longitudinal bars 23, and upstanding bracket members 38 serve to connect the lateral extensions of the cross bar 36 to the bars 27. These bracket members 38 serve as supports for the rear bearings of the harvester rolls, to be referred to hereinafter. Reinforcing straps 39 may be welded at their ends to the frame bars 23 and at intermediate points to the upper face of the cross bars 29 and 36.

The harvester frame is pivotally mounted on the tractor through horizontally aligned pivot pins 40 carried by the frame, preferably mounted on bracket plates 41 mounted on the rear portions of the frame bars 27, with the pivot element extending through and outwardly from the plate and welded thereto and braced thereon. The pins 40 are received in bearing recesses of bracket bearing members 45 which are open at their rear ends, the bearing pins being held in operative position in their bearing brackets 45 by removable locking pins 46. The bearing brackets are each mounted in position through a hanger portion 47 secured, preferably in a removable manner, by one or more screw bolts 48 to an underneath part of the depending side portions 9 of the rear axle housing 7. The laterally projecting pivot pins 40 are in such position with respect to the other portions of the harvester frame that the tractor may be propelled rearwardly over the harvester frame and parts carried thereby when the frame is supported on the ground, with its rear end at a suitable elevation, until the rear end of the bearing brackets 45 pass over and receive the pivot pins therein.

The forward end of the harvester frame is hung from the tractor at an adjustable height above the ground through a pair of hanger rods 51 removably suspended from brackets 52 attached to each side of the tractor frame 3. The lower end of each of the hangers 51 is removably attached to an arm 53 mounted on a sleeve 54 which is rotatably mounted on journals carried by brackets 56 mounted on the forward side of upstanding bracket plates 57 indirectly attached and in spaced relation to the frame parts 23, 26 and 32, as shown in Fig. 35 and referred to hereinafter. A counterbalancing spring 60 of the tension type, attached at its forward end, through a bail or rod 61, to an arm 62 on the rotatable sleeve 54, and connected at its rear end through a rod 63 adjustably connected to the cross bar 36 or preferably a bracket 58, as indicated in Fig. 16, thereon, exerts a biasing turning moment on the rotatable sleeve 54, to thereby exert a lifting effect on the harvester frame through the hanger rods 51, thus partially counterbalancing the weight of the forward part of the harvester to any desired extent, determined by the initial tension placed on the spring through the adjustable connection of the rod 63 to the cross bar 36 or a bracket thereon. Adjustable connection at the rear end of the rod 63 is preferably obtained through a nut 63' adjustably positioned on the threaded end of the rod, which latter passes loosely through an aperture in the upright bracket 58 on cross bar 36, the nut 63' bearing against the rear face of the bracket.

The forward portion of the harvester frame may be raised or lowered, against the biasing effect of the spring 60, by an actuating lever 65 having a handle portion within reach of the tractor operator and with its lower end secured to a bracket on a sleeve 67 which is rotatable on journals mounted on brackets carried by the rear end of the adjacent frame bar 27 and by the cross bar 29. The sleeve 67 has an arm 68 to which the rear end of a yielding operating connection 69 is attached, the forward end of this operating connection being attached to an arm 70 on the rotatable sleeve 54. The operating lever 65 is held in desired position corresponding to the desired height of the forward end of the harvesting mechanism above the ground, by a conventional form of latch 72' carried by the lever and engaging in an appropriate notch of a quadrant 73' suitably mounted on a rear portion of the harvester frame, or the drive housing thereof, referred to hereinafter.

As the lever 65 rotates in a counterclockwise direction, it acts, through arm 68 on sleeve 67, to shift operating connection 69 forwardly and, through arm 70 on sleeve 54, the lever arm 53 on the sleeve 54 is rotated in a clockwise direction; and since the point of connection of hangers 51 to the brackets 52 on the tractor frame are fixed, the result is that the forward part of the harvester frame moves downward about the bearings of the pivot pins 40 to a degree determined by the new position of the lever 65. As the spring 60 counterbalances a considerable portion of the weight of the harvester frame, the lowering of the forward end of the latter may be controlled through a relatively small force applied to the lever 65. On movement of the lever 65 in a clockwise direction, then, through the operating connections described hereinabove, the sleeve 54 and arm 53 thereon are moved counterclockwise, with the result that the front end of the harvester frame moves upward about its pivot pins 40 to a new position determined by the new position of the lever 65. In this latter adjustment, the effect of the counterbalancing spring 60 is to greatly reduce the force that is required to be applied to the actuating lever 65 to accomplish the lifting operation.

As more particularly shown in Figs. 16, 17 and 18, the operating connection 69 between the arm 68 on sleeve 67 and the arm 70 on sleeve 54, instead of being a rigid one, is made yielding to permit the forward end of the frame to lift incident to travel of the harvester over uneven ground during operation, without affecting the position of adjustment of the hand lever 65. This yielding connection is in the form of a rod 71 connected to the arm 70 on sleeve 54 and adjustably secured into the end of a tube 72, as by being adjustably threaded thereinto, and a rod 73 connected to the arm 68 on sleeve 67 and having its other end passing into a U-shaped frame 74 through an aperture in the closed end thereof. The open end of the frame 74 surrounds and is secured to the adjacent end of the tube 72, the end of the latter forming an interior abutment for one end of a compression spring 76, a collar 78 on the rod 73, within the U-frame 74 and engaging the cross piece at the closed end of the frame 74, forming the other abutment for the spring. As the rod 73 is shifted to the left, on counterclockwise movement of the lever 65, the unbalanced weight of the harvester is permitted to move the tube 72 and the frame 74 attached thereto in the same direction in which the rod 73 is shifted, until the closed end of the frame 74 abuts the collar 78 on the rod 73 in the newly adjusted position of the lever 65. As the rod 73 is shifted toward the right by the lever 65, to raise the harvester, the rod 73, acting through the engagement of the collar 78 with the closed end of the frame 74, shifts the tube 72 to the right to accomplish the desired lifting of the harvester. As the forward end of the harvester rises and falls in traveling over rough ground, the compression spring 76 permits the incidental movement of the sleeve 72 and frame 74 without shifting the rod 73 or affecting the adjustment of the lever 65.

The tube 72 is provided with a transverse aperture 80 at a point beyond the adjacent end of the rod 73 when the latter is in normal position; and a removable pin 81 may be inserted through the aperture 80 when it is desired to limit the movement of its tube 72 relative to the rod 73; and when the parts are in this condition, the operating connection 69 acts as a substantially nonextensible or nonyielding connection between the arm 68 of sleeve 67 and the arm 70 of sleeve 54. Use is made of this nonyielding connection of the parts 72 and 74 when it is desired to detach the harvester from or mount it on the tractor, particularly in detaching the hanger rods 51 from the tractor frame, as referred to hereinafter.

An enclosing housing, shown particularly in Figs. 36 and 37, of a power transmitting drive 82 is removably mounted on a pair of spaced brackets 83 preferably detachably secured by bolts to and extending rearwardly from the cross bar 29 of the harvester frame. The housing includes end sections 85, 86 having separate closures 87 at their lower side, detachably secured in position by bolts passing through aligned holes in the flanges of the housing sections and the closures. Each of the sections 86, 85 has its inner end wall 89 secured in preferably permanently sealed relation to the walls of the respective housing sections. The intermediate section 90 of the housing is left open at its lower side.

A sectional bearing supporting frame is mounted within each of the end sections 85, 86 of the housing, this supporting frame comprising a bearing supporting section 91, disposed substantially at right angles to the longitudinal axis of the housing, and a second bearing supporting section 92 disposed at substantially right angles to the first section 91. This bearing supporting frame is secured in position in the housing by means of removable bolts 93, 94. The bolts 94 pass through the rear side wall of the housing section and are threaded into the supporting section 91, and the bolts 93 pass through the front wall of the housing and are threaded into the supporting section 92. A bearing housing 95 is secured in position in an opening through the front wall of each housing section and the bearing supporting section 92 therein, the bearing housing 95 preferably being secured in position through the same bolts 93 which serve to secure the bearing support 91, 92 in position, these bolts passing through an external securing flange on the bearing housing 95 and through the front wall of the housing and being threaded into the support 91, 92.

A shaft section 96 is mounted in the housing section 85, and a shaft section 97 is mounted in the housing section 86, in bearings carried by the respective bearing supporting sections 91, and is in guided and sealed relation with a removable sealing device 98 in the inner end wall 89 of the respective housing sections. The inner ends of the shafts 96 and 97 are splined and project into the intermediate housing section 90. Bevel gears 99 are mounted on the outer ends of the shafts 96 and 97, the hubs of these gears preferably serving as journals for the shafts in the bearings carried by the supports 91. The gears 99 mesh with bevel gears 100 carried by the rear ends of forwardly extending shafts 101 mounted in bearings carried by the bearing housings 95.

The forward end of the bearing housing 95 is provided with an oil-tight seal held in place about a flanged sleeve 102 keyed to the shaft and removably held in position on the forward end of the shaft and serving to hold the bearing in position in the housing. A flexible coupling 103, preferably in the form of a double universal coupling, has a rear end flange detachably bolted to a flange on the sleeve 102, and a forward end flange which may be detachably bolted to a flange on a coupling sleeve 104 secured to the end of a shaft for operating harvesting rolls, referred to hereinafter.

An enclosing gear casing 105 is removably mounted within the intermediate section 90 of the main drive housing, through removable screw bolts 106 passing through the front wall of this housing section about an opening therein and into the adjacent wall of the gear casing, and removable bolts 108 passing through other wall portions of the housing and into supporting projections of the gear casing. The bolts 106 also pass through an external flange on a bearing housing 109, and when drawn up tight serve to seal the opening in the housing section. The lower side of the gear casing 105 has an opening therein normally closed by a removable closure plate 110 secured in sealing relation with the casing.

A longitudinally extending shaft section 112 is mounted in bearings in the end walls of the gear casing 105, and these walls are provided with removable seals 113 about the bearings to prevent leakage of lubricating fluid from the casing. The ends of the shaft section 112 project beyond the casing; and each of the projecting ends is splined and fits into the adjacent end portion of a correspondingly splined removable coupling sleeve 115, 115ª, respectively, the other end of which receives the adjacent splined end of shaft section 97, 96, respectively, the coupling sleeves detachably connecting the adjacent shaft ends in alignment and constituting a detachable driving connection between the shaft sections. The coupling sleeve 115ª connecting the shaft sections 96 and 112 is provided at its end adjacent the housing section 85 with a sprocket wheel 116.

A bevel gear 117 on the shaft section 112, a hub section of this gear constituting a journal for the shaft, meshes with a bevel gear 118 on the inner end of a shaft section 119 extending forwardly with a slight upward inclination and mounted within one or more bearings carried by the bearing housing 109. The forward end of this shaft is provided with a removable sleeve holding the bearing in position and, in conjunction with a sealing device between the sleeve and the bearing housing, serving to close the forward end of the gear casing against leakage of lubricating fluid. A universal coupling sleeve section 121 is secured on and in fixed relation on the forward end of the shaft section 119, the forward section 123 of the coupling having mounted therein the rear end of a forwardly extending shaft section 124, the latter being rotatable in the section 123 and removably held against appreciable longitudinal movement therein. The forward portion of the shaft 124 is in two splined sections 125, 126 separated by a collar or enlargement 127 of greater diameter than the splined sections.

The forward end of the coupling section 123 is provided with rounded ratchet teeth normally meshing with corresponding ratchet teeth, as indicated at 128, on a flange portion at the rear end of an internally splined sleeve 129 surrounding and meshing with the splined shaft section 125. The ratchet teeth of the elements 123 and 129 are held in normal meshing relation to constitute a ratchet clutch by a compression spring 130 surrounding the splined section and bearing directly, or through a bearing washer against the flange at the rear end of the sleeve 129 and a nut 131 adjustable upon the collar portion 127 of the shaft 124, the spring being maintained in position by the collar 127 and the body of the sleeve 129, it being contemplated that the adjustment of the nut 131 will be such as to normally hold the ratchet teeth in driving relation and permit release on predetermined overload. The normal action is that the shaft 124 drives the universal coupling and shaft 119 through the splined section 125, the sleeve 129 and the normally meshing ratchet teeth of the sleeve 129 and the coupling section 123. However, if the load on the shaft 119, driven through the universal coupling 121, 123, exceeds a predetermined limit corresponding to the position of adjustment of the nut 131, then the ratchet teeth of the sleeve 129 ride over the ratchet teeth of the coupling section 123, against the action of the spring, and the shaft 119 is stalled until the load thereon is reduced to such value as warrants driving through the ratchet clutch.

The upper wall of each of the housing sections 85, 86 are apertured at an intermediate point, and an upwardly projecting bearing housing 137 is secured in sealed relation in such opening. A shaft section 138 is mounted in bearings carried by the housing 137, the latter being suitably sealed against leakage of lubricating fluid therefrom. A bevel gear 140 is secured to the lower end of the shaft 138 within each housing section and in driven relation to a bevel gear 141 secured to shafts 97, 96, respectively. One or more sealing washers 143 are preferably disposed between the lower face of the bearing housing 137 and the upper face of the gear 140, these washers being in sealing and slipping relation when the parts are in operative relation. Mounted on the upper portion of the shaft 138 is a bearing sleeve 145 having an enlarged bell-shaped lower end 146 surrounding and spaced from the bearing housing 137, and having a sprocket wheel 147 formed on its lower end. A normal driving connection between the shaft 138 and the sleeve 145 is established through a clutch collar 148 secured to the shaft, as by a taper pin driven through the collar and the shaft. The upper face of the clutch collar 148 is provided with clutch teeth normally meshing with corresponding clutch teeth on the lower face of a clutch collar 149 on, or having a driving connection with, the sleeve 145. The releasable clutch elements 148, 149 are normally held in driving relation by a compression spring 151 bearing against the upper end of the bell-shaped enlargement 146 of the sleeve and against a collar or washer 152 restrained against upward movement by a nut 153 adjustable on the upper end of the shaft and preferably held in position by a lock nut. In operation, if the load of the sleeve 145 and the sprocket carried thereby should exceed a predetermined value, dependent on the characteristics of the spring and the adjustment of the nut 153, the sleeve will be forced upward, against the action of the spring, and the ratchet collar 148 will rotate without effectively driving the ratchet collar 149 on the sleeve, until such time as the load on the sleeve is sufficiently reduced to again warrant normal driving relation between the parts.

The casing sections 85 and 86 and the gearing casing 105 are normally filled with lubricating fluid to insure operation of the gears in a bath of such fluid; and they are provided with suitably disposed removable closures at the upper and under sides to provide for filling and draining lubricating fluid from the sealed enclosures. The upwardly extending bearing housings 146 are preferably separately sealed and provided with filling openings at the upper side of the bearing within the housing.

With the parts of the power drive 82 in assembled relation, and the shaft 124 connected to the power take-off shaft 12 of the tractor engine, the shaft 119 is driven and the latter, through bevel gears 117, 118, drives the shaft 112 and the connected shafts 96 and 97 and the sprocket wheel 116 on the coupling 115ª. The shafts 96 and 97, acting through the bevel gear connections 99, 100, drive the forwardly extending shafts 101 and the parts associated therewith, and through bevel gear connections 140, 141, drive the upwardly extending shafts 138 and the parts associated therewith.

Each picker husker unit, shown more particularly in Fig. 26, comprises a pair of oppositely rotatable cooperative rolls, the outer roll being indicated generally at 156 and the inner roll at 157. These rolls are rotatably supported in operative position through journal portions on the roll shafts at their rear ends in bearings 158 whose housings are supported in relatively fixed position in the bearing supporting plate 38, and at an intermediate point in bearings 159 mounted in the bearing support 34 adjacent the forward end of the longitudinal bars 27. The axis of the outer roll is substantially higher than the axis of the inner roll, as more particularly indicated in Figs. 42 and 43.

The outer roll 156 is built up of sections rigidly secured, as by pins 160, on a shaft 161. The forward or snapping element of the roll includes a relatively pointed forward end section 162 extending forwardly beyond the shaft 161 and being of decreasing and disappearing taper toward the rear end thereof. This forward portion of the snapping section is provided with external spiral ribs 163 of gradually increasing pitch toward the rear end. A rear portion 164 of the snapping section is secured on the shaft immediately adjacent the forward portion 162, the exterior of this portion 164 being provided with equally spaced external longitudinal ribs 165, preferably four in number, extending to a point adjacent the rear end. The angular position of the portions 162 and 164 on the shaft is such that the rear ends of ribs 163 of section 162 are in longitudinal alignment with the longitudinal ribs 165 of the section 164.

Rearwardly of and spaced from the roll portion 164 is a trash roll section 167 secured to the shaft and provided with longitudinal ribs 168, preferably of considerably greater number than the ribs 165 of section 164, and extending from the forward end of the section to a point adjacent the rear end of the section where the latter is of reduced diameter to provide a shouldered extension 169.

The husking roll section 172 of the roll 156 is in the form of a cylindrical tube of rubber or the like providing a resiliently yielding and generally smooth husking surface and secured on a cylindrical metal tube 173, the assembled tube and rubber roll section being secured in position with respect to the shaft 161 by pins 174 driven through apertures in the roll section and in the shouldered extensions 169 of the roll section 167 and in the same manner in oppositely shouldered extensions 175 at the forward end of a trash roll section 176. When the pin 174 is driven into position, the inner end engages the shaft and, due to the taper groove at the inner end, expands in the space between the shaft and an undercut wall of the sections 167, 176, respectively, to lock the pin against withdrawal while these roll sections are on the shaft. The roll section 176 is secured by a pin 160 to the shaft 161 and is provided with longitudinal ribs 178, generally similar in character and number to the ribs 168 on the roll section 167. The rear end of the roll section 176 is undercut and receives the forward end of the housing for the roll bearing 158 carried by the supporting plate 38. A spur gear 179 is rigidly secured in position on the rear end of the shaft 161 in such a manner with respect to the bearing support that the roll shaft is held in definite position against appreciable longitudinal movement relative to the bearing support. The gear 179 is in driven relation with the spur gear 180 on the shaft 181 of the harvester roll 157.

The harvester roll 157 is of sectional construction and is mounted on its shaft 181, with the forward snapping or picking section 162, 164 of the same design and construction as the corresponding section 162, 164 of the roll 156. The trash roll section 182 is similar to the corresponding section 167 of the roll 156, except for omission of the reduced extension 169 on the section 167. The husking roll section 183 of the roll 157 is in the form of a cylindrical relatively smooth metal tube preferably removably secured, by screws or the like, on the rear end of the roll section 182 and on the forward end of a second trash roll section 184, generally similar to the roll section 176 of the roll 156, except as to the omission of the reduced forward end extension 175 on the roll section 176. The undercut rear end of the roll section 184 receives the forward end of the housing for the roll bearing 158, this housing being carried by the supporting plate 38. The roll section 183 is provided with longitudinal rows of diametrically aligned apertures 186 for receiving yielding husking elements 187 preferably of spring metal.

Each of these husking elements 187 comprises a body portion insertable through the apertures 186 to position within the roll and of a length such that, with the element in normal position, a husking point or peg 191 at one end thereof projects through an aperture 186, and the other end of the element, having a through aperture 192 therein, projects past the adjacent trailing edge of the diametrically opposite aperture 186 of the roll. Each spring element 187 is held in normal position, with the husking point 191 projecting through an aperture 186, by a bracing leaf spring 193 whose curved central portion bears against the shaft, and one end portion presses the body portion of the element 187 against the inner surface of the roll; and a shouldered portion 194 of reduced width at the other end of the spring 193 is yieldingly urged through the aperture 192 in the adjacent end of the husking spring 187 and the adjacent aperture 186 in the roll, thus serving, through engagement of this reduced end portion of the bracing spring against the adjacent edge of the aperture 186, to hold the husking element in operative position on the roll. The husking point 191 is formed on the element 187 by distorting the end of the spring element to form a hook-shaped point. The resiliently yielding body portion of the husking element 187 projects the husking points 191 to a position where they bite into the husks of the ears passing over the rolls and tear the husks and draw them downwardly into the space between the oppositely rotating rolls, the latter seizing the husks and drawing them through the rolls, the ears remaining on the upper side of the rolls. As the husking points 191 come into engagement with the husking roll 183, they are yieldingly forced back into the apertures 186.

The forward bearing support 34 carries the roll bearings 159 on which rotate journal sleeves 195 suitably held in position on the shafts 161 and 181, as by a spacing and retaining collar and key; and the support is provided with machined guiding surfaces on which the housings 196 for the roll bearings 159 are supported. These bearing housings are maintained in position between the adjacent snapping roll and trash roll sections. The element 34 is provided with a shoulder at its forward side against which corresponding shoulders on the bearing housings 196 may engage. A yielding spacer 197 is preferably inserted between the two bearing housings. The outer end of the support 34 is provided with a tubular projection 198 which houses a spring 201 in normal position. This spring bears at its inner end against the outer bearing housing and at its outer end against an abutment carried at the inner end of an adjusting screw 202 threaded through a plate 203 fitted into a recess 204 in the wall of the tubular housing 198 and removable therefrom by lifting the plate with the adjusting screw therein outwardly from such recess. The spacing element 197 is preferably secured to the inner bearing housing and includes a fiber or like slightly compressible plate 205 held between shims.

With the parts in position, the spring 201 urges the outer bearing into and yieldingly holds it at its innermost position, with a predetermined pressure dependent upon the adjustment of the screw, so that the relative positions of the two harvesting rolls are such that the husking roll sections 172, 183 are in substantial contact, as indicated in Fig. 29, and there is a slight clearance between the outer peripheries of the trash roll sections 167, 182 and 176, 184, and between the rear portions of the snapping roll sections 164, as indicated in Figs. 28 and 30. However, in the event any relatively unyieldingly obstruction, such as an extra heavy stalk or small stone should come between the rolls, the spring 201 will yield sufficiently to permit separation between the forward portions of the rolls to the required extent to permit the obstruction to pass through the rolls.

The several sections of the rolls are assembled on their shafts in such a manner that the ribs 165 on one of the roll sections 164 will be substantially in line with corresponding ribs on the other of such roll sections as they pass a point between the rolls, as indicated in Fig. 27, and the longitudinal ribs on one of the trash roll sections 167, 182 and the trash roll sections 176, 184 will be out of alignment with the corresponding ribs on the other of such trash roll sections as they rotate past a point at the inner side of the rolls, as indicated in Figs. 28 and 30, respectively.

One or both of the snapping roll sections 164 are provided adjacent the rear end thereof with one or more detachable snapping clips 206 extending radially outward slightly beyond the periphery of the ribs 165. The clips 206 are attached in circumferentially adjustable position on the rolls through screw bolts 207 passing through elongated apertures in a base portion 208 of the clip. The active portion of the clip is positioned slightly rearwardly of the lagging edge of the rib 165 on the roll at a point where the clip will just clear or pass by the adjacent rib on the opposite roll without interference during rotation of the rolls, these clips during such operation serving to shear or cut any ear stems that are not snapped off.

Each pair of rolls is driven through shaft 101 of the main drive, the universal connection 103, and the coupling section 104 secured to the rear end of the shaft 181, this latter shaft being rotated in a counterclockwise direction, viewed from the rear; and, through the gear connection 180, 179, the other harvester roll is driven in an opposite direction.

Attached to each longitudinal frame bar 23, as through brackets 212, is a plate 213 projecting outwardly from the bar 23 toward and overlying the adjacent harvester roll 157 to act as a stripper plate, and this plate extends forwardly from a point adjacent the bearing support 34 to a point in advance of the forward end of the frame bar 23 and overlies an extension 214 at the forward end thereof. The forward portion of the inner edge of the plate 213 is inclined inwardly; and the plate has a downwardly turned outer edge projecting toward and overlying the adjacent roll 157. The upper face of the plate at its outer edge is preferably provided with a removable wearing strip for a gathering chain.

A bracket or frame 215 is adjustably mounted on the forward portion of the plate 213 through bolts 218 having an enlarged shank portion 219 adjacent the head of the bolt and passing through a transversely elongated slot 220 in the base of the frame, and the reduced lower portion of the bolt passes through and projects downwardly beyond a longitudinally elongated slot 221 through a reinforced portion of the plate 213. A guide collar 223 surrounds the upper end of the reduced shank of the bolt 218 and bears against the underside of the enlarged portion 219 of the shank, and it projects slightly below the undersurface of the reinforced portion of the plate 213. A nut 224 is threaded on the lower end of the bolt and may be drawn up tightly, preferably through the intermediary of a washer extending beyond the sides of the slot 220, against the lower face of the spacing collar 223. The frame 215 may be thus held fixed against movement transversely of the plate 213, but at the same time the frame is free to move longitudinally of such plate. On release of the nuts on the bolts 218, the frame may be adjusted transversely of the plate 213.

A bracket carrying a rearwardly opening shield for the forward point of the adjacent harvester roll 157 is preferably secured in position on the under side of the forward end of the bar 23 or its forward extension.

With the supporting frame 215 fixed in a predetermined transverse position, the frame is yieldingly urged forwardly along the plate 213 by an abutment nut 226 adjustably held in position on the forward end of a rod 227, the latter passing in guided relation through an aperture in the rear end wall 228 of the frame 215. The rod 227 is yieldingly urged forwardly by a compression spring 229 held between an adjustable nut 231 and washer associated therewith on the rod and an abutment 232 on a supporting bracket frame 234 and through which the rod passes. An abutment 235 on the rear end of the rod 227 is cooperative with the abutment 232 to limit the forward movement of the rod and the supporting frame 215. The frame 234 is supported in transversely adjustable position on the plate 213 and an upper bracket element on the outer wall of a shield 274, referred to hereinafter, by separate bolts 236 passing through apertures in the latter bracket and the plate 213 and its supporting brackets 212, and through transversely elongated slots 237 in the upper and lower walls of the frame. With the securing nuts on bolts 236 withdrawn from clamping position, the position of the supporting frame 234 may be adjusted laterally with respect to the plate 213.

Due to the fact that the rod 227 has only a loose guiding fit in the apertures of the abutment walls 228 and 232, variation of the lateral position of the supporting frame 234 does not affect the action of the rod, urged by the spring 229, in yieldingly urging forward the frame 215 independently of the transverse position of either of the supporting frames 215 or 234. A chain sprocket 238 is mounted for free rotation on a bearing sleeve 239 held clamped in position by a bolt 240 passing through apertures in the forward end portion of the upper and lower walls of the frame 215; and due to the action of the spring pressed rod 227 on the frame 215, this sprocket is yieldingly urged to a forward position to maintain in desired taut condition a combined gathering and conveying chain 241 on the sprocket, having conveying flights 242 and driven by the sprocket 147 of the power drive near the rear end of the harvester frame. The flights 242 are of reduced height toward their outer ends and the outer portions of the flights lie over the harvester rolls 156, 157 to a sufficient extent to draw stalks into the snapping rolls and to engage and convey picked ears rearwardly along the rolls. These chain flights preferably extend from the chain in a direction having a slight component in a trailing direction with respect to the travel of the chain, as indicated in Fig. 10.

Chain guides 243 and 244 for the rearwardly traveling working course of the chain 241 are detachably secured to the outer walls of the supporting frames 215 and 234, respectively, for guiding or limiting the lateral movement of this portion of the chain. Through lateral adjustment of the frames 215 and 234, in the manner described hereinabove, the chain guides 243 and 244 may be laterally adjusted to some extent to best provide for the chain satisfactorily handling different crops under different conditions.

Trough-shaped plates 245, shown in detail in Figs. 49, 50 and 51, are removably secured by bolts, through a vertical flange or wall 246 at its outer side adjacent the rear end thereof to a bracket 247 attached to the forward side of each end section 85, 86 of the main drive housing, and it is also removably secured by bolts at a forward point to an upper flange or bracket 248 on the bearing supporting plate 38. The lower portion of this outer side wall of the plate 245 flares inwardly to the bottom of the plate. This trough plate 245 has its rear portion resting on the upper side of the respective end section 85, 86 of the drive housing, with an inclined discharge lip extending rearwardly and downwardly past the rear edge of the housing section, as indicated at 249; and it has its forward end secured in position by bolts 250 passing through a flange on the bracket 32 and a flange on the lower edge of the upright bracket plate 57, spacers surrounding these bolts to maintain the desired spaced relation between the latter flange and the bracket 32, this spacing corresponding to the height of the inner side wall portion 251 of the plate 245. The forward portion of the outer side wall 246 of the trough plate 245 is of reduced height, and at its forward end adjacent the bearing support 38 it is distorted inwardly, to form a lip, as indicated at 252, lying over the gears 179, 180 on the rear end of the roll shafts.

Longitudinally extending chain guides 253 and 254 for the working course of the chain are secured in position by bolting the same, to the bottom of the trough-shaped plate 245; and an inner chain guide 256 for the return course of the chain is secured in like manner on the bottom of the trough-plate. A guide sprocket 257 for the chain is mounted on a bearing sleeve held in position by a bolt, in the same general manner as the front sprocket 238, this bolt passing through and securing the bearing sleeve between the bottom of the plate 245 and a bracket plate 259 mounted in position on the upper face of the adjacent ends of the chain guides 253, 254. The position of the sprocket 257 is such as to properly determine the position of and guide the active course of the chain with respect to the harvesting rolls, so that the flights thereof lie in suitable position over the rolls.

A supporting bracket 261 is mounted on the upper side of the forward end of the plate 213, as more particularly indicated in Fig. 14, this bracket carrying a suitably braced and vertically offset flange portion 262 on the upper face of which a gathering spider 263 of dished formation and having a central hub portion 264 rotatably mounted on a bearing sleeve held in adjustable position by a bolt passing through the bearing sleeve and through a longitudinally elongated slot in the flange portion 262 of the bracket. The bracket itself is preferably held in laterally adjustable position by bolts passing downwardly through an aperture in the bracket and through transversely elongated slots 267 in the forward end portion of the plate 213, the bolts being held in position by units at the lower side of the plate. The axis of the dished spider is inclined both forwardly and outwardly at a slight angle, preferably about fifteen degrees, to the vertical, so that the lowermost portion of the tips of the teeth of the spider are at the forward inner side thereof, in a position immediately adjacent the ground so that they may rake the surface of the ground and lift down stalks and ears during operation of the machine.

Forwardly extending frame bars 271 are pivotally mounted on a horizontal axis on a pivot carried by a bearing 272 at the front end of the forward extension 214 of the frame bars 23; and the forward portion of these bars gradually curve inwardly. Upstanding side shield elements 273 of gradually reduced height toward their forward end are secured to the bars 271, and with the bars extend beyond the forward end of the shields; and the rear end of these shields fits outside the forward end of inner gathering shields 274; the pivotal movement of the bars 271 and shield elements 273 carried thereby being limited through engagement of inwardly extending bolts 275 at the upper rear end of the shilds 273 passing through elongated slots in the forward end of each gathering shield 274.

Each gathering shield 274 is mounted in position at its forward end by the bolts 236 passing through an inner flange bracket on the outer wall of the shield and through the bracket frame 234, as indicated in Fig. 41. The upwardly rising outer wall of each shield 274 is turned inwardly to provide an approximately horizontal edge portion which is secured to a flange on the upstanding bracket plate 57. The lower substantially vertical side wall of the shield 274 preferably has a rearward extension 276, the rear end being inclined inwardly, and this vertical wall being secured to the upper face of the chain guides 253, 254, preferably by the same bolts as are used to secure the chain guides in position on the trough plate 245.

Mounted on the front end of the tractor frame is the upper section 281 of a center divider, this section comprising a forwardly extending roof section 282 and a downward projection 283 therefrom having an inclined and generally curved forward wall with side portions extending alongside and spaced from the front end of the tractor frame. This upper section is detachably secured in position by means of brackets 284 secured to the inner side of the roof and side wall portions, the upper plate of these brackets and the roof section having apertures therethrough which fit over the turned up end 285 of the upper flange of brackets 286 removably attached to the side frame of the tractor. The lower end of each bracket 284 has a guiding fit in an aperture in a lower flange of the bracket 286. In this condition, the weight of the upper section is carried by the upper flange of bracket 286. The divider section 281 is releasably held in operative position by latches 289 inserted through slots in an inner plate portion of the brackets 284, the lower edge of the latch having a recessed portion with a rounded upper side, as indicated at 290, which fits over the edge of the lower wall of a slot in the plate portion of the bracket 284, this edge serving as a pivot on which the latch may rotate. After the latch is inserted in the slot in the bracket 284 from the inner side thereof, a cotter pin 291, passed through an aperture in the outer edge portion of the latch, engages the side walls of the slot in bracket 284 to restrain inward movement of the latch about its pivot.

A weighted extension 293 near the upper edge of the inner side of the latch biases the latch to a position wherein this extension lies immediately below the upper flange of the bracket 286, thus restraining the divider section 281 against upward removal from the tractor. To remove the upper divider section, the operator reaches from underneath and rotates the latch 289 outwardly on its pivot so that the extension 293 clears the upper flange of the bracket 286; and then the upper section may be moved upwardly to withdraw the bracket 284 from the turned up end of the upper flange on the bracket 286 and to withdraw the lower end of the bracket 284 from the aperture in the lower arm of the bracket 286, thereby permitting complete withdrawal of divider section from the tractor.

The upper fixed section 281 of the center divider is provided at a forward central point with an aperture 295 through which a crank may be inserted for starting the tractor engine. With this crank aperture in a fixed portion of the center divider, the position of vertical adjustment of harvester frame or other parts does not interfere with cranking the engine.

A lower center divider section 296 has its upper edge of generally rounded form, fitting over the correspondingly shaped lower edge portion of the upper section 281 of the center divider and has rearwardly extending side portions through which this lower section is pivotally mounted in a detachable manner to a lower rear edge portion of the upper section of the divider, preferably through a removable pivot bolt passing through suitably stiffened portions of the side walls of the two sections. A pointed traveling shoe 299 is mounted on the lower divider section at its lower forward end; and the lower edge of this section is provided with reinforced side strips each provided with a bail or loop 301 into which the forward ends of the pivoted arms 271 on the side shield 273 project with a loose guided fit, thus assisting in bracing the lower edge portion of this center divider section 296, while at the same time permitting pivotal movement of this divider section and the shield 273, and insuring that the divider section may follow the raising and lowering of the forward end of the harvester frame to which the shields 273 are pivotally attached.

An inner rear shield section 308 is secured in position by bolts, preferably the same bolts as hold the chain guide 256 in position, passing through a flange at the inner edge of shield section and into or through this chain guide. The upwardly and outwardly rising wall at the forward portion of the shield is secured by bolts to an upper flange on the rearwardly extending guide wall section 276 of the shield 274; and the rear portion of the shield 308 of gradually reducing height has a vertical flange at its upper edge in engagement with the inner side of the rear portion of the guide wall extension 276.

A rear end shield or guard 310, overlying the upwardly extending driving shafts 138 of the main power drive on which the sprockets 147 are mounted, has forwardly extending side walls 313 inside which the rear ends of the rear extensions 276 of the shield 274 fit and which are preferably bolted to such extensions, preferably in a manner to provide longitudinal adjustment of the fixed connection between the parts. The end shield 310 is preferably provided with a rear plate connected to and bracing the side walls 313 and preferably provided at its lower rear edge with a downwardly turned guard lip 316. The end shield 310 is secured in position by one or more bracing straps 317 attached to the rear wall and the side walls 313 of the shield and having their forwardly extending ends bolted to the outer face of the extension walls 276 adjacent the rear end thereof.

A separate forwardly extending frame bar 321 is detachably secured by one or more bolts 323 and positioning pins 324 to the outer side of the forward end of each frame bar, this bar 321 extending forwardly in substantially the same plane as the bar 27 and the adjacent portion of the frame bar 23; and it has an extension 325 secured to the bar at its forward end.

A transversely adjustable rear stripper plate 327, inclined downwardly so that its inner edge lies over and adjacent harvester roll 156, is mounted on upper flange portions of brackets 328 secured to the frame bar 321, bolts 329 passing through transversely elongated slots 331 in the stripper plate and apertures in the flange on brackets 328 secured to the bar 321. These bolts 329 preferably have spacer collars thereon lying in the transverse slots of the stripper plate, a nut on the upper end of each bolt being turned down against the spacing collar so as to secure the collar in fixed position as a guide along which the slotted portion of the stripper plate may move transversely across the brackets 328. This stripper plate is held in any desired position of adjustment with respect to the bar 321 by means of hand bolts 334 each threaded through a projection 335 at the lower side of a flange on brackets 328 and passing through an aperture in an outer flange 336 of the stripper plate and held against movement relative to the latter by a flange or enlargement on the bolt bearing against the outer face of the flange 336 and a nut 337, the latter being held in position by a lock nut, on the bolt bearing against the inner face of the latter flange. As the bolts are rotated, they withdraw from or enter the projecting lugs 335 on the brackets to cause the stripper plate 327 to be shifted laterally inward or outward to the desired extent with respect to the adjacent picker section of the harvester roll.

Forwardly of the stripper plate 327 is a second stripper element 340 mounted on the frame bar 321 and the forward extension 325 thereof, by bolts 342 passing through apertures in the frame bars 321 and through transversely elongated slots 343 in the stripper element 340.

The inner edge of the stripper plate 340 is in the form of a pair of pivoted stripper sections or leaves 346, 347 having hub sections 348 at their remote ends and 349 at their adjacent ends, and through which a pivot spindle 351 passes, this spindle likewise passing through apertures in hinge brackets 352 and an intermediate hinge bracket 353 secured in position at the inner edge of the body portion of the plate 340. The intermediate hinge bracket 353 has an upstanding projection flanged over at its upper end, as indicated at 354, this flange having at its inner edge a downwardly inclined projection 355, projections 356 on the adjacent hub portions 349 of the pivoted stripper leaves 346, 347 being engageable with the underside of the stop 355 to limit the downward movement of the stripper leaves. Torsion springs 357 surround portions of the pivot spindle 351 between the hub portions 348, 349 of each stripper leaf; and one end of the springs bear against the adjacent inner edge of the body portion of the stripper element 340 and the other end of the springs bear against the outer edge of the adjacent stripper leaf. A guard plate 358 overlying the hinge brackets may be secured in position on the upper face of the flange 354. Through this arrangement, the springs bias the stripper leaves downwardly to a position, indicated in Fig. 42, wherein further downward movement of the leaves is restrained by engagement of the projections 357' on the leaves with the stop 354. In operation, the stripper leaves may be rotated on their pivot, so as to raise the inner edges of the leaves, by a low-hanging ear or a heavy stalk beneath the leaves, to permit an ear to pass upwardly of the inner edges of the leaves, thus insuring that the corn ear and the portion of the stalk to which it is attached are brought to the upper side of the stripper plates into a position where the ear may be subjected to the normal action of the snapping roll sections.

A forwardly extending bracket 361 (see Figs. 44 through 48) is pivotally mounted, through a base flange 362 and an upper bracket portion 363 thereof, on a bearing sleeve 364 clamped in position between the upper face of the stripper element 340 and the lower face of the bracket 363, by the most forward bolt 342 passing through an aperture in the forward end of the bar 321 and a transversely elongated slot 343 in the stripper element 340, the securing nut 367 on the upper end of the bolt holding the parts in position. The pivoted bracket 361 is biased inwardly about its pivot by a spring 369 bearing against the outer face of a vertical web of the bracket and is held in position thereagainst under adjustable compression by a nut on the outer end of a bolt 370 passing through the web of the bracket 361 and a vertical flange of a bracket 371 adjustably secured to the inner edge of the stripper element 340 and the extension 325 by a bolt 372 which passes through a transversely elongated slot in the bracket 371. Through this connection, the bracket 371, against which the head of the bolt 370 bears, may be adjusted laterally to vary the normal biased condition of spring 369 and position of the bracket 361.

At the forward end of the bracket 361, a vertically offset flange portion 373 is provided, this flange portion being turned laterally inward. A bearing sleeve is held in adjustable position between the upper face of the offset flange portion 373 and a securing nut on the upper end of the holding bolt 376, the bolt passing through a longitudinally elongated slot 378 in the flange 373. The hub 379 of a dished gathering spider 381 is mounted for free rotation and against axial movement on the bearing sleeve. The axis of rotation of the gathering disk or spider is inclined forwardly and inwardly to a slight extent from the vertical, preferably about fifteen degrees in each direction, so that the teeth of the spider at a point forwardly and inwardly of the pivotal axis constitute the lowest point of the disk, that is, the position closest to the ground. The position of adjustment of the pivot of the disk is preferably such that in operation the tips of the teeth of the spider pass along in substantial contact with the teeth on the gathering spider 263 mounted at the forward end of the stripper plate 213.

A rearwardly directed shield 383 open at its rear end may be attached in position through the bolt 372 securing the bracket plate 371 in position, or one or more other bolts, to the underside of the extension 325, the rear open end of this shield guarding the forward point of the adjacent harvester roll 156.

An outer gathering shield 384 is attached in position through a flange at the inner lower edge thereof, to the stripper plate 327, through the bolts 329 which mount the stripper plate on the bar 321, the shield extending upwardly and curving outwardly to a substantially vertical outer side wall portion, generally as indicated in Figs. 45 and 48. The upper portion of this gathering shield may be braced in position by one or more bracing rods secured thereto and to the outer edge of the stripper plate 327, and the lower outer edge of the gathering shield may be suitably stiffened and held in position by one or more braces or plates detachably secured to such lower edge portion and to the outer edge of the stripper plate, as shown in Fig. 48.

A supporting hub or sleeve 385 is mounted on the forward end of the extension 325 of the frame bar 321 and a bracket secured to the bar 321. A rod 386 is pivotally mounted in the hub 385 and carries a forwardly extending channel-like frame 387 of gradually tapering width toward its forward end; and a traveling shoe point 389 is mounted on the forward end of the channel frame 387. A shield 390 of tapering width and generally semicircular cross section is mounted on the shoe 389 and the inner edge of the channel frame 387. This gathering shield may be suitably stiffened along its lower outer edge. The shield 390 may rise and fall to a limited extent about the pivot rod 386, with the rear end of the shield riding over and along the forward end portion of the shield 384, the upward movement of the shield 390 being limited by binding engagement between the rear end of such shield and the adjacent portion of the gathering shield 384.

An auxiliary shield 391, in the form of a dished plate, is attached in position within the lower inner portion of the gathering shield 384 by one or more brackets attached thereto, and serves as a special shield for the body portion of the gathering disk or spider 381.

A rearwardly extending substantially vertical guide plate or wall 392 is attached to the lower rear part of the inner side wall of the gathering shield 384, this guide wall extending rearwardly, with its rear end bent inwardly, to the forward edge of the outer guide wall 246 of the trough plate 245, and an extension or rod 393 fits into a bail or slotted part 394 carried at the outer side of the wall 246. With this arrangement the rear end of the guide wall 392 is definitely positioned with respect to the trough plate and forms, in conjunction with the wall 246, the outer side of a conveyer trough through which the active course of the chain 241 passes, the inner wall of this conveyer trough being formed by the rear extension 276 of the inner gathering shield 274 and the chain guides 253 and 254 on which the extension 276 is mounted.

A transversely extending hollow bracket portion 396 is secured to and supported by the upper portion of the inner side wall of the gathering shield 384 and is provided with a depending forward wall 397, this bracket portion forming a bracing connection between the outer shield 384 and the adjacent portion of the inside gathering shield 274. The inner edge of the bracing bracket portion 396 is provided with a securing bracket or extension 398 at its underside fitting beneath a securing clip 401 attached to the vertical bracket plate 57, the bracket 398 having rearwardly opening slots 402 which fit about the shank portions of bolts 403 passing through the clip 401. Securing nuts are drawn up tight against the clip 401 to secure the inner edge of the transverse bracket portion 396 of the outer gathering shield 384 in position.

An ear pressing or retarding plate 404 has a pivot pin 405 secured to its forward end and pivotally mounted in brackets 406 secured to the upper edge of the extension wall 392 and to the upper edge of the side wall extension 276 of the inner shield 274. The outer end of the pivot pin is bent down at right angles, as indicated at 407, beyond the outer side wall of the extension 392. The retarding plate 404 extends rearwardly and downwardly at an angle of approximately 45 degrees from its pivot and its rearward end 408 lies substantially horizontal under normal conditions. The rearwardly inclined portion has downwardly extending bracing ribs or flanges 409 at its side edges, and the rearward portion has its side edges flanged upwardly and outwardly, as indicated at 410, these latter flanges being of reduced height and width toward the rear and merging into the side edges of the inclined portion of the plate.

The retarding plate lies over the husking sections of the harvester rolls and presses downwardly upon the ears of corn carried along by the chain and forces them into such intimate contact with the husking roll sections as to insure that the rolls, particularly through the action of the husking pegs thereof, will seize the husks and start the latter through the rolls, to thereby remove the husks.

The retarding plate is yieldingly urged downward by a tension spring 412 secured in an adjustable manner at one end to a bracket 413 attached in adjustable position to the extension wall 392 on the gathering shield 384, and at the other end to the downwardly projecting portion 407 of the pivot rod. The portion 407 of the pivot rod bears against the rearward edge of the bracket 413 to limit the downward movement of the retarding plate about its pivot to such a degree as to permit the plate to yieldingly press ears of different sizes against the rolls, while at the same time not interfering with the passage of the flights of the conveyor chain.

The elevating conveyor 20 comprises spaced substantially vertical side walls 421 each having an outwardly rolled and inturned flange at its upper edge and a bottom wall 423. At the lower end of the housing, the upper portion of the side walls are flared outwardly to form a well portion 426 having generally vertical upper side wall portions connected by inclined wall portions to the lower vertical side wall portions of the housing. A bar 427 is preferably connected across the upper flanged portions of the side walls and serves to brace these wall portions of the well. The extreme lower rear end of the housing is preferably closed by a swingable door 429 pivotally mounted on adjacent portions of the lower vertical side walls. The free end of this door or closure 429 is detachably secured in position to the bottom of the well portion of the conveyor, as indicated at 431.

A shaft section 432 extends transversely across the lower end of the conveyor housing and passes through and is rotatably mounted and held against longitudinal movement in bearings whose housings are carried by tubular bushings or collars 434 secured to and projecting outwardly from the side wall sections 421. A chain sprocket 435 is fixed to the shaft 432 at a point intermediate the sides of the conveyor. The outer surface of the tubular bushings 434 have formed thereon or secured thereto pivot journals 436 to provide for pivotal movement of the conveyor as a whole. These journals 436 are carried and rotatable in bearing supports or brackets 438 removably mounted on the longitudinal frame bars 23 adjacent the rear end thereof. The rear side of the bearing portions of the supports 438 are open to permit insertion of the pivot journals 436 into operative position, the journals being held against withdrawal from operative position by removable securing pins 439.

Forwardly projecting rods or bars 451 secured to the vertical side wall portions of the conveyor well 426 fit in and project through bails 452 on the outer side walls of the trough plates and serve to position the conveyor 20 in operative position with respect to the harvester frame and the parts carried thereby, with the forward edge of the well 426 beneath discharge lip 249 of the trough plate 245 and the lip 316 on the rear end of the guard 310. The conveyor is held in normal elevated position by a pair of suspending or bracing rods 454 pivotally attached to an intermediate portion of the side walls of the conveyor housing, the forward end of these rods being adjustably and removably secured in position with respect to the tractor by bolts passing through the rods and through elongated slots in brackets 457 detachably secured to the engine frame or the rear axle housing at opposite ends thereof, the rods being so shaped and secured to the tractor at such points as to permit greatest freedom of movement of the operator without interference from these supporting rods. On removal of the attaching bolts from the brackets 457, the bracing rods may be swung rearwardly to a point where the end thereof rests on the ground to support the upper end of the conveyor.

The body portion of the conveyer housing is provided with a transverse partition wall or plate 461 extending throughout the length of the conveyor, the side portions of the plate being curved upwardly and secured to the upper flaring portion of the side walls of the housing. This cross-sectional shape of the partition plate 461 provides an active upper conveying surface on the partition having upwardly curving side edges.

At the upper end of the conveyer, a spindle or shaft 463 is secured in position against rotation in the side walls of the housing, while permitting controlled bodily movement of the shaft in the direction of the length of the conveyer for the purpose of tightening the chain. This effect may be secured through bolts 465 passing through a flange on brackets 467 secured to the outer face of the side walls of the conveyer, these bolts passing through the ends of the shaft and having draw nuts thereon for varying the separation of the shaft from such flanges. A chain sprocket 468 is freely rotatable on the intermediate portion of the shaft, being suitably constrained against appreciable movement longitudinally of the shaft.

A conveyer chain 469 passes over this sprocket 468 and the sprocket 435 mounted within the lower end of the conveyer housing, the sprockets being so disposed relative to the partition wall 461 that the upper course of this chain travels along the upper surface of the partition wall, the return course of the chain passing beneath the partition 461 to the lower sprocket 435. Conveyer flights 470 are secured to the conveyer chain, the flights standing generally perpendicular to the direction of travel of the chain, and the edge of the flights traveling over the partition 461 being of substantially the same shape, with upwardly curving side portions, as the upper face of the partition wall. Through this provision, any loose kernels of corn carried upwardly by the conveyor will always roll downwardly along the curved side edges of the plate 461 to a central position where they lie in the direct path of the conveyor flights and will thus be positively conveyed upwardly by the latter, without any danger of the kernels passing downwardly past or lodging between the edges of the flights and the adjacent side wall.

The space between the upper end of the partition wall 461 and the lower wall of the conveyor housing is suitably closed to prevent the return passage of material downwardly therethrough. A deflecting hood 471 fits about and is attached in position on the upper end of the conveyor housing in position to receive all the material passing over the rear edge of the partition 461 and the bracket guards about the shaft 463 and conduct the material to the lower and rear open discharge edges of the hood.

A spout 475 having a transverse wall 476 and opposed side walls of generally triangular shape fits over the rear end of the hood 471 and is pivotally mounted thereon through pivot bolts carried by the side walls of the hood and the side walls of the spout. In the position shown in full lines, wherein an edge of the side wall of the spout is held against a stop 479 on the hood, most of the material discharging from the hood will strike the transverse wall 476 of the spout and be deflected downwardly with a forward component, so that, with a trailing wagon attached, the discharge of material may be directed from the spout toward the forward portion of the wagon. With the spout 475 adjusted to its dotted line position, wherein another edge of the side wall of the spout engages a stop 480 on the hood, the material discharging from the hood will flow rearwardly over the transverse wall of the spout and be discharged downwardly with a rearward component, thus insuring that the material will be deposited in the rear portion of the trailing wagon. Through this adjustable mounting of the discharge spout, material may be deposited on the trailing wagon in such a manner as to fully and evenly load the latter. The trailing wagon is preferably attached through a draft connection to the rear cross bar 25 of the harvester frame.

The adjustment of the discharge spout 475 to each of its two positions is accomplished by a single pull on an operating cord 481 whose forward end is carried to a point within convenient reach of the tractor operator, and whose rear end is secured to one end of bracket 482 fixed to the side wall of the spout. A spring 483 is connected at one end to a bracket mounted on the side wall of the hood and at its other end to the bracket 482 at a point which is diametrically opposite, with respect to the pivot of the spout, the point of attachment of the cord 481 to this bracket. With the spout in the position shown in full lines, a sharp pull on the cord 481 will serve to rotate the discharge spout clockwise about its pivot until the point of attachment of the spring to the bracket 482 moves downwardly past the pivotal connection of the spout to the hood, the spring being under increasingly greater tension during this movement. As the spring passes the pivotal point of the hood, the spring is immediately effective of itself, or supplemented by the weight or momentum of the moving hood, to quickly complete the movement of the spout about its pivot to the dotted line position wherein the edge of the side wall of the spout engages the stop 480 on the hood. When the spout is to be moved from the dotted line position to the full line position, a similar pull on the cord is effective to rotate the spout in an anticlockwise direction until the spring becomes effective to complete the movement of the spout to the full line position wherein the edge of the spout engages the stop 479 on the hood.

Outwardly beyond the adjacent pivot journal 436 of the conveyor 20, a sprocket 485 is rotatably mounted on the shaft 432, and is spaced from the adjacent end of the housing of the shaft bearing by a bearing washer. A driving chain 485 passes over this sprocket and the sprocket 116 on the coupling 115a between the shaft sections 96 and 112 of the power drive, this chain entering the intermediate section 90 of the drive housing through the lower open side thereof. This drive chain is of a type which can readily be opened at at least one point for facility in assembling the chain on and removing it from the sprockets, the removable closure plate 429 at the lower end of the elevator conveyer housing facilitating such operation.

A clutch element 487 is secured to the shaft 432, as by a pin driven through the connected elements, outside the sprocket 485. The outer face of the clutch element 487 is provided with a suitable form of frictional clutching surface, either plain frictional or ratchet type, and the adjacent surface of a clutch element 489 is such as to frictionally engage the clutching surface of the element 487, the element 489 being urged into clutching relation with the element 487 by a spring 490 engaging the end of a tubular portion of the clutch element 489 and held in compression to the desired extent by a washer and adjustable nut 491 on the outer end of the shaft. An annular element 492 is mounted, through a sleeve portion thereof, on a tubular outer extension of the clutch element 489 and is provided with a radial flange at its outer end. Axially extending pins 493 secured in the element 492 project through spaced apertures in the sprocket 485 and, with the parts in this condition, form a normal driving connection between the element 489 and the sprocket 485. A compression spring 494, preferably lighter than the spring 490, surrounds the latter spring and bears at its inner end against the flange on the element 492 and is held in compression by the nut 491. The normal driving connection between the sprocket 485 and the shaft 432 may be broken at will through a clutch lever 495 pivoted on a bracket attached to the conveyer housing and having an operating connection with the element 489. On suitable actuation of the lever 495 the element 492 is drawn outwardly, against the action of the spring 494, until the driving pins 493 are fully withdrawn from the apertures in the sprocket 485, at which time the latter is free to rotate on the shaft. The lever 495 is suitably held in driving and non-driving positions by fitting into enlarged portions of a recess 496 of the bracing bar 427.

Operation of the clutch lever 495 has no effect toward disturbing the normal driving relation between the clutch elements 489 and 487 which are independently held in clutched relation by the inner spring 490. However, if the load on the driving shaft 432 should at any time exceed a predetermined amount dependent upon the stress on the spring 490, the latter will yield and permit rotation of the clutch element 487 on the shaft independently of the clutch element 489, thus interrupting the drive to the sprocket 485 until the load on the shaft returns to normal.

Mounted within the hollow rear end of each of the outer longitudinal frame bars 27 is an extensible lifting and supporting jack comprising an outer end portion 501 in the form of a threaded shank element rigidly braced on and secured to a foot portion 502 which serves as a closure for the chamber within the frame bar 27 in which the jack is received. The inner element of the jack is in the form of a threaded shank 503 rigidly secured at its inner end to a U-shaped element 504, the latter having pivotally connected thereto a bail 506. The elements 501 and 503 are adjustably secured together by a turnbuckle element 507 having an intermediate cross piece 508. The jack is secured in position within the enclosure formed by the rear end of the frame bar 27 by means of a pin 509 inserted through an aperture 512 in the frame bar and through the turnbuckle element 507 between the cross piece 508 and the inner end of the threaded shank 501. This pin is held in position by means of a projection thereon at one end and a removable cotter pin passing through the other end outside of the frame bar.

On removal of the cotter pin and withdrawal of the securing pin 509, the jack may be drawn outwardly until the bail 506 is opposite the aperture 513 in the frame bar for receiving the pin 509; the jack may be further drawn out until the inner end of the bail engages the pin inserted in aperture 513 and prevents further withdrawal movement. At this point in the withdrawal of the jack, the body portion of the jack, made up of the threaded elements 501 and 503 and the turnbuckle 507 may be swung downwardly on the projecting outer end of the bail 506 until the inner end of the U-shaped element 509 passes underneath the rear end of the frame bar 27 at which time each jack may be made to carry its share of the weight of the rear end of the frame, through suitable adjustment of the turnbuckle 507. With the jacks in this position, as illustrated in Figs. 1 and 2, and carrying the weight of the rear end of the harvester frame, the tractor may be withdrawn forwardly from the harvester frame, after the connections between the harvester frame and the tractor are removed, and the tractor may thereafter be backed into normal operative position with respect to the harvester frame.

With the corn harvester, including the elevating conveyer, mounted on the tractor, the harvester assembly is fairly well balanced about its pivots, with allowance for the necessary excess weight at the forward end to insure downward bias thereof; and a complete picker-husker unit is carried at each side and below the front portion of reduced width of the tractor, with the forward portion of the harvester rolls laterally outside of the tread of the front tractor wheels and the harvester rolls laterally within the tread of the rear tractor wheels, and the stripper plates, the yielding forward bearing of the outer harvester roll, the gathering spiders and the forward chain guides suitably adjusted for the general conditions of the crop. The central divider and the front wheels of the tractor travel between two adjacent rows of corn, and the rear tractor wheels travel outside of these rows. If the stalks are in a generally down condition, the forward end of the harvester frame is tilted down so that the forward traveling shoes on the central divider and the outer gathering shields ride along or adjacent the ground and, through action of the center divider and the forward gathering shields, supplemented by gathering spiders 263 and 381, broken and down stalks are lifted toward the vertical position, and fallen ears are lifted. As the stalks come under the influence of the gathering chain, they move along the stripper element 213 and the forward hinged leaves 346, 347 of the stripper element 340, these leaves yielding sufficiently to permit any low hanging ears to ride upwardly to the upper side of the stripper plates. As the stalks move along the snapping sections of the rolls, the bearing of the outer roll 156 yields sufficiently to accommodate the stalks between the rolls, until the rear portion of the snapping section snaps off the ears, the latter remaining always above the stripper plates, so that the kernels adjacent the butts of the ears cannot be drawn into or pinched by the rolls.

The relatively rearward movement of the upper part of the stalks along the rolls is limited by the stalks engaging with the bearing housing 34 and forward wall 397 of the inwardly projecting bracing extension 396 of the outer gathering shields. Loose stalk leaves or other trash carried beyond the snapping roll sections is seized by and carried through the trash roll sections 167. The picked ears are conveyed by the flights of the chain 241 over and in contact with the husking roll sections, the yielding presser plate 404 insuring sufficiently forcible contact of the ears with the rolls to enable the husking rolls to seize and peel off the husks, carrying the latter downwardly through the rolls. The formation of the presser plates and the flights 242 of the conveying chain are such that the presser plate accomplishes its desired function without interference with the chain. Loose husks remaining from the husking operation are seized and passed through the rear trash roll sections 184. The conveying chain carries the husked ears from the husking sections, over the guard lip 252 of the trough plate 245, and onto and along the bottom wall of the trough plate from the rear end of which the ears drop into the well 426 at the forward end of the elevating conveyor 29, which carries the ears upwardly and discharges them into a trailing wagon.

With a tractor mounted harvester of the character herein described, the oiling and greasing points of the tractor are accessible for servicing the tractor without removing the harvester therefrom.

When it is desired to remove the harvester from the tractor, with the engine stopped and preferably with the clutch on the tractor power take-off released, the rear elevator suspension rods 454 may be consecutively removed from their attachment to the tractor and swung down so that their ends rest on the ground and carry the weight of the conveyer; and the rear elevator chain 486 may be disconnected from the elevator driving sprocket 485. If desired, the support afforded by the rods 454 resting on the ground may be dispensed with and the conveyor housing may be swung down on its pivots 436 so as to be on the ground.

The pivot bolts attaching the lower center divider shield to the upper section of such divider are removed, and then the lower section of this divider can be removed forwardly from the upper section and from the forwardly extending bars 271 pivoted to the frame bars 23. The upper section of the center divider can then be removed forwardly after releasing the securing latch 289. The outer gathering shield assembly may then be removed on loosening the bolts 403, passing through the rearwardly opening slots of a bracket portion on the inner part of the bracing extension 393 of the outer gathering shield, and the bolts 323 connecting the frame bars 321 to the frame bars 27 are removed. In this condition, the outer gathering shield is drawn forwardly to release the rear extension bar at the rear end of the extension wall 392 on the gathering shield from the bail on the outer wall 246 of the trough plate 245. The outer gathering shields and associated parts can then be fully removed from the other portions of the harvester, so as to permit forward travel of the rear wheels of the tractor.

The pins 509 are removed from the rear end portions of the frame bars 27 and the supporting jacks are drawn out from their housings in the ends of these frame bars and secured in supporting position, as indicated in Figs. 1 and 2, and the turnbuckles are adjusted so that the jacks take the weight normally carried by the bearing brackets 41 mounted on the rear axle housing.

In removing the connection of the suspending rods 51, the pin 81 is inserted through the aperture 80 in the tube 72 of the connecting device 69, and the front end of the harvester frame may then be lifted, through the actuating lever 65, to relieve the strain on the rods 51, and the upper ends of these rods are then removed from the brackets 52 of the tractor frame. The front end of the harvester is then dropped to the ground, preferably with a block or other support placed under the forward ends of the bars 23.

After removal of the locking pin 46 from the pivot brackets 45, the tractor may be started and driven forward, the pivot brackets moving away from the pivot pins 40, and the power take-off shaft on the tractor separating itself from the forward splined section of the shaft 124. The tractor can then be driven clear of the harvester. For facility in storing the elevator conveyer, it may be wholly removed from its attachment to the harvester frame, or removal of the securing pins 439 from the pivot bearing brackets 438.

To mount the harvester on the tractor, the rear end of the harvester frame is supported on the supporting jacks 501, as hereinabove described, and the tractor is backed to a position wherein the sleeve at the rear end of the power take-off shaft 12 on the tractor passes over the forward end of the splined section on the shaft 124; and the tractor may then be backed fully to position wherein the bearing brackets 45 pass over and receive the pivot pins 40 on the harvester frame. The remaining operations, and a suitable sequence thereof, in mounting the harvester in operative position on the tractor will be apparent from the description hereinabove with respect to removal of the harvester from the tractor.

It should be understood that this invention is not limited to the particular details of construction and design shown and described herein and that the invention includes such other applications and modifications as are fairly included within the scope of the annexed claims.

It is claimed and desired to secure by Letters Patent:

1. In combination, a narrow mobile frame having a power source thereon and having a wide rear axle structure mounting a pair of laterally spaced traction wheels, a corn harvester comprising an elongated supporting frame detachably connected to said mobile frame to extend therealong and under said axle structure in the space between said wheels, said supporting frame presenting laterally spaced forward portions disposed below and adjacent opposite sides of said mobile frame, a pair of cooperative harvesting rolls mounted on each forward portion of said supporting frame and extending forwardly therealong from laterally spaced points adjacent to and below said axle structure, a power transmitting mechanism enclosed in an elongated housing mounted on said supporting frame to extend crosswise thereof in adjacent relation to the rear ends of said harvesting rolls, harvested material conveying means carried by said supporting frame in rearward continuing relation with respect to the material supporting surfaces afforded by the rear end portions of each pair of said harvesting rolls, said conveying means extending beneath said axle structure, over said housing and rearwardly beyond the latter, and a harvested material receiving means mounted on the rear of said supporting frame in partially underlying relation with respect to the rear end of said conveying means, said supporting frame, rolls, conveyer means, power transmitting mechanism and harvested material receiving means providing a unitary base structure with the portions thereof in advance of said axle structure having an overall width and height such that when said unitary structure is detached from said mobile frame and rests on the ground therebeneath, said mobile frame may be propelled forwardly over and away from said unitary structure, and said power transmitting mechanism having operative driving connections with said rolls and conveyers and including a power input shaft having a forwardly projecting exposed portion detachably connected with a power take-off portion of said power source.

2. In combination, a narrow mobile frame having a wide rear axle structure mounting a pair of laterally spaced ground engaging wheels, a corn harvester comprising an elongated supporting frame detachably connected to said mobile frame to extend therealong and under said axle structure, said supporting frame having laterally spaced forward portions disposed below and adjacent opposite sides of said mobile frame, cooperative harvesting rolls mounted on each laterally spaced portion of said supporting frame and extending rearwardly therealong to laterally spaced points adjacent to and below said axle structure, a pair of harvested material conveying means carried by said supporting frame in rearward continuing relation with respect to the material supporting surface afforded by the rear end portions of said harvesting rolls, said conveying means converging rearward and extending along said supporting frame beneath and beyond said axle structure, and a harvested material receiving means mounted on the rear portion of said supporting frame in symmetrical relation with respect to the central longitudinal axis of said mobile frame and in partially underlying relation with respect to the rear ends of said conveying means, said supporting frame, rolls, conveying means and hopper structure providing a unitary base structure having with the portions thereof in advance of said axle structure an overall width and height such that when said unitary structure is detached from said mobile frame and rests on the ground therebeneath, said mobile frame may be propelled forwardly over and away from said unitary structure.

3. A structure according to claim 2 wherein said mobile frame includes an operator's station disposed in adjacent overlying relation to said axle structure, and wherein said harvested material receiving means includes an elevating conveyer having its material receiving end supported for vertical swinging movement about a transverse pivot axis and being additionally supported by means of a pair of rods having their rear ends pivotally connected with a portion of said elevating conveyer remote from said material receiving end and having their forward ends pivotally detachably connected with portions of said mobile frame laterally adjacent opposite sides of said operator's station, said rods being swingable rearward relative to said conveyer upon being detached from said mobile frame and into an underlying ground engaging supporting position with respect to said conveyer.

4. In combination, a mobile frame having a rear axle structure mounting a pair of laterally spaced wheels, a corn harvester comprising an elongated supporting frame detachably connected to said mobile frame to extend therealong and under said axle structure in the space between said wheels, cooperative harvesting rolls mounted on a forward portion of said supporting frame and extending rearward therealong to a point adjacent to and below said axle structure, a conveying chain operatively mounted on said supporting frame and having its active course extending therealong over said rolls and rearward therefrom beneath and beyond said axle structure, an inner gathering shield mounted on said supporting frame and including a generally vertical wall portion extending rearward along the inner side of said rolls above the active course of said chain, said supporting frame, rolls, shield and conveying means providing a unitary base structure with the portions thereof in advance of said axle structure having an overall width and height such that when said unitary structure is detached from said mobile frame and rests on the ground therebeneath, said mobile frame may be driven over and away from said unitary structure, an elongated frame element detachably fixedly secured to an outside front portion of said supporting frame in forwardly extending relation thereto, and an outer gathering shield carried by said frame element and including an inner generally vertical wall portion extending rearward along the outer side of said rolls in spaced opposed, trough forming relation to the vertical wall portion of said inner shield, said frame element and outer shield comprising a unit attachment which may be readily bodily removed from said unitary base structure.

5. A structure according to claim 4 wherein said outer gathering shield includes a laterally projecting inward extension detachably bracedly connected to an opposed portion of said inner shield.

6. A structure according to claim 4 wherein said rolls include side-opposed rear husking sections, and wherein a rearwardly extending wall portion of said outer gathering shield carries a presser plate mounted for movement toward and away from said husking roll sections by means of a pivot mounting including a detachably connected part carried by an opposed wall portion of said inner shield.

7. In combination, a mobile frame having a rear axle structure mounting a pair of laterally spaced ground engaging wheels, a harvester comprising a supporting frame pivotally connected to said mobile frame to extend therealong, said connections including elements coacting to provide a rear pivot support and a flexible front support, said supports affording vertical swinging movement of said supporting frame about a transverse pivot axis, a crop harvesting means carried by a forward portion of said supporting frame, and counterbalancing and actuating mechanism mounted wholly on said supporting frame and rendered operative through attachment of said connections to selectively vertically adjust the position of said supporting frame relative to said mobile frame and to balance said supporting frame in its selected position of adjustment, said supporting frame, crop harvesting means, and said counterbalancing and actuating mechanism providing a base structure detachable as a unit from said mobile frame.

8. A structure according to claim 7 wherein said balancing and actuating mechanism includes means yieldingly affording a limited up and down movement of said base structure relative to said mobile frame.

9. A structure according to claim 7 wherein said balancing mechanism includes parts selectively actuable to render said balancing mechanism ineffective, as desired.

10. In combination, a mobile frame including a transverse supporting axle structure mounting a pair of laterally spaced ground engaging wheels, a harvester comprising an elongated supporting frame detachably connected to said mobile frame to extend therealong and under said axle structure in the space between said wheels, harvesting mechanism carried by a forward portion of said supporting frame and disposed generally in advance of said axle structure, conveying means carried by said supporting frame to extend therealong in coacting relation to said mechanism and under said axle structure in position to move harvested material rearwardly from said mechanism and beneath said axle structure, said supporting frame, harvesting mechanism and conveying means providing a unitary base structure having an overall width and height such that when said unitary structure is detached from said mobile frame and rests on the ground therebeneath, said mobile frame may be propelled over and away from said unitary structure, said harvesting mechanism comprising a pair of cooperative side opposed rolls extending forwardly downward relative to said mobile frame, a front portion of said supporting frame mounting a freely rotatable gathering spider disposed outside and forwardly of one of said rolls, and said supporting frame mounting a gathering shield disposed in partially overlying relation to said gathering spider, said shield including a generally vertical wall portion extending rearward along the outer side of said one roll.

11. In combination, a mobile frame including a transverse supporting axle structure mounting a pair of laterally spaced ground engaging wheels, a harvester comprising an elongated supporting frame detachably connected to said mobile frame to extend therealong and under said axle structure in the space between said wheels, harvesting mechanism carried by a forward portion of said supporting frame and disposed generally in advance of said axle structure, conveying means carried by said supporting frame to extend therealong in coacting relation to said mechanism and under said axle structure in position to move harvested material rearwardly from said mechanism and beneath said axle structure, said supporting frame, harvesting mechanism and conveying means providing a unitary base structure having an overall width and height such that when said unitary structure is detached from said mobile frame and rests on the ground therebeneath, said mobile frame may be propelled over and away from said unitary structure, said harvesting mechanism comprising a pair of cooperative side opposed rolls extending forwardly downward relative to said mobile frame, said conveying means comprising an endless chain having its active course extending over said rolls and rearwardly therefrom beneath and beyond said axle structure, a front portion of said supporting frame mounting a freely rotatable gathering spider disposed outside and forwardly of one of said rolls, and said supporting frame mounting a gathering shield disposed in partially overlying relation to said gathering spider, said shield including a generally vertical wall portion extending along the outer side of said one roll above the active course of said chain.

12. In combination, a mobile frame including a transverse supporting axle structure mounting a pair of laterally spaced ground engaging wheels, a harvester comprising an elongated supporting frame detachably connected to said mobile frame to extend therealong and under said axle structure in the space between said wheels, harvesting mechanism carried by a forward portion of said supporting frame and disposed generally in advance of said axle structure, conveying means carried by said supporting frame to extend therealong in coacting relation to said mechanism and under said axle structure in position to move harvested material rearwardly from said mechanism and beneath said axle structure, said supporting frame, harvesting mechanism and conveying means providing a unitary base structure having an overall width and height such that when said unitary structure is detached from said mobile frame and rests on the ground therebeneath, said mobile frame may be propelled over and away from said unitary structure, an auxiliary frame element detachably fixedly secured to the outer side of a front portion of said supporting frame in forwardly extending relation thereto, and an outer gathering shield carried by said frame element and including an inner generally vertical wall portion extending rearwardly along the outer side of said harvesting mechanism, said frame element and shield comprising a unit attachment which may be readily bodily removed from said unitary base structure.

13. In combination, a mobile frame including a transverse supporting axle structure mounting a pair of laterally spaced ground engaging wheels, a harvester comprising an elongated supporting frame detachably connected to said mobile frame to extend therealong and under said axle structure in the space between said wheels, harvesting mechanism carried by a forward portion of said supporting frame and disposed generally in advance of said axle structure, conveying means carried by said supporting frame to extend therealong in coacting relation to said mechanism and under said axle structure in position to move harvested material rearwardly from said mechanism and beneath said axle structure, said supporting frame, harvesting mechanism and conveying means providing a unitary base structure having an overall width and height such that when said unitary structure is detached from said mobile frame and rests on the ground therebeneath, said mobile frame may be propelled over and away from said unitary structure, said harvesting mechanism comprising a pair of cooperative side opposed rolls extending forwardly downward relative to said mobile frame, an inner gathering spider is freely rotatably mounted on a front portion of said supporting frame outside and forwardly of the inner roll thereon, an auxiliary frame element detachably fixedly secured to the outer side of a front portion of said supporting frame in forwardly extending relation thereto, and an outer gathering spider freely rotatably mounted on a front end portion of said frame element outside and forwardly of the outer one of said rolls and in cooperative relation to said inner spider, said frame element and outer spider comprising a unit attachment which may be readily bodily removed from said unitary base structure.

14. In combination: a mobile frame including a transverse supporting axle structure mounting a pair of laterally spaced ground engaging wheels; a harvester attachment comprising an elongated supporting frame having front and rear portions detachably interconnected to and suspended from said mobile frame and extending along said mobile frame in generally parallel relation thereto and under said axle structure in the space between said wheels, comprising harvesting mechanism carried by a forward portion of said supporting frame and disposed generally in advance of said axle structure, and comprising conveying means carried by said supporting frame extending therealong in generally parallel relation thereto for a major portion thereof and extending therealong in coacting relation to said mechanism and under said axle structure in position to move harvested material rearwardly from said mechanism and beneath said axle structure; said elongated frame, harvesting mechanism and conveying means constituting a bodily movable unitary base structure having an overall width and height respectively less than the lateral spacing of said wheels and the ground clearance afforded by said mobile frame and axle structure whereby when said unitary base structure is detached from said mobile frame and rests on the ground therebeneath said mobile frame may be propelled over and away from said unitary structure.

15. In combination: a mobile frame including a transverse supporting axle structure mounting a pair of laterally spaced ground engaging wheels; a corn harvester comprising an elongated supporting frame having front and rear portions detachably interconnected to and suspended from said mobile frame and extending along said mobile frame in generally parallel relation thereto and under said axle structure in the space between said wheels, comprising a material confining trough structure carried by a rear portion of said supporting frame and extending forwardly therealong below said axle structure, comprising cooperative harvesting rolls mounted on said supporting frame and extending forwardly therealong in downward continuing relation with respect to the material supporting surface afforded by the forward end of the bottom portion of said trough structure, and comprising conveying means carried by said supporting frame extending therealong in generally parallel relation thereto for a major portion of the length thereof in overlying coacting relation to at least one of said rolls, through said trough structure and to a point of discharge at the rear of said axle structure; said elongated frame, trough structure, harvesting rolls and conveying means constituting a bodily movable unitary corn harvester structure having an overall width and height respectively less than the lateral spacing of said wheels and the ground clearance afforded by said mobile frame and axle structure whereby when said unitary corn harvester structure is detached from said mobile frame and rests on the ground therebeneath said mobile frame may be propelled over and away from said corn harvester.

16. In combination: a mobile frame including a transverse supporting axle structure mounting a pair of laterally spaced ground engaging wheels; a harvester attachment comprising an elongated supporting frame detachably interconnected to and suspended from said mobile frame and extending along said mobile frame in generally parallel relation thereto and under said axle structure in the space between said wheels, said supporting frame having forwardly extending laterally spaced portions positioned at opposite sides of said mobile frame generally in advance of said axle structure, comprising harvesting mechanism carried by each of said laterally spaced portions of said supporting frame and disposed generally in advance of said axle structure, and comprising conveying means carried by said supporting frame extending therealong in generally parallel relation thereto for a major portion thereof and extending therealong in coacting relation to said mechanism and under said axle structure in position to move harvested material rearwardly from said mechanism and beneath said axle structure; said supporting frame, harvesting mechanism and conveying means constituting a unitary base structure with the portions thereof in advance of said axle structure having an overall width and height respectively less than the lateral spacing of said wheels and the ground clearance afforded by said mobile frame and axle structure such that when said unitary structure is detached from said mobile frame and rests on the ground therebeneath said mobile frame may be propelled forwardly over and away from said unitary structure.

17. In combination: a mobile frame including a transverse supporting axle structure mounting a pair of laterally spaced ground engaging wheels; a harvester attachment comprising an elongated supporting frame having front and rear detachable connections for supporting and suspending same from said mobile frame, said supporting frame extending along said mobile frame in generally parallel relation thereto and under said axle structure in the space between said wheels, comprising harvesting mechanism carried by a forward portion of said supporting frame and disposed generally in advance of said axle structure, and comprising conveying means carried by said supporting frame extending therealong in generally parallel relation thereto for a major portion thereof and extending therealong in coacting relation to said mechanism and under said axle structure in position to move harvested material rearwardly from said mechanism and beneath said axle structure; said elongated frame, harvesting mechanism and conveying means constituting a bodily movable unitary base structure having an overall width and height respectively less than the lateral spacing of said wheels and the ground clearance afforded by said mobile frame and axle structure whereby when said unitary base structure is detached from said mobile frame and rests on the ground therebeneath said mobile frame may be propelled over and away from said unitary structure, said connections including elements coacting with said mobile frame to provide pivot supports affording vertical swinging movement of said unitary base structure about a transverse axis disposed adjacent said axle structure.

18. In combination: a mobile frame including a transverse supporting axle structure mounting a pair of laterally spaced ground engaging wheels; a harvester attachment comprising an elongated supporting frame having front and rear detachable connections for supporting and suspending same from said mobile frame, said supporting frame extending along said mobile frame in generally parallel relation thereto and under said axle structure in the space between said wheels, comprising harvesting mechanism carried by a forward portion of said supporting frame and disposed generally in advance of said axle structure, comprising conveying means carried by said supporting frame extending therealong in generally parallel relation for a major portion thereof and extending therealong in coacting relation to said mechanism and under said axle structure in position to move harvested material rearwardly from said mechanism and beneath said axle structure; said supporting frame, harvesting mechanism and conveying means constituting a unitary base structure having an overall width and height respectively less than the lateral spacing of said wheels and the ground clearance afforded by said mobile frame and axle structure such that when said unitary structure is detached from said mobile frame and rests on the ground therebeneath said mobile frame may be propelled over and away from said unitary structure, said connections including elements coacting with said mobile frame to pivotally support said unitary structure for vertical swinging movement about a transverse axis disposed adjacent said axle structure, and comprising additional mechanism carried by said supporting frame for vertically adjusting the position of said unitary structure relative to said mobile frame and to balance said unitary structure in any selected position of adjustment.

19. In combination: a mobile frame including a transverse supporting axle structure mounting a pair of laterally spaced ground engaging wheels; a harvester attachment comprising an elongated supporting frame having front and rear detachable connections for supporting and suspending same from said mobile frame, said supporting frame extending along said mobile frame in generally parallel relation thereto and under said axle structure in the space between said wheels, comprising harvesting mechanism carried by a forward portion of said supporting frame and disposed generally in advance of said axle structure, and comprising conveying means carried by said supporting frame extending therealong in generally parallel relation thereto for a major portion thereof and extending therealong in coacting relation to said mechanism and under said axle structure in position to move harvested material rearwardly from said mechanism and beneath said axle structure; said elongated frame, harvesting mechanism and conveying means constituting a bodily movable unitary base structure having an overall width and height respectively less than the lateral spacing of said wheels and the ground clearance afforded by said mobile frame and axle structure whereby when said unitary base structure is detached from said mobile frame and rests on the ground therebeneath said mobile frame may be propelled over and away from said unitary structure, said connections affording a flexible front support and a rear pivot support for said unitary structure, the latter support comprising complementary elements disposed adjacent said axle structure in position for disconnection upon effecting a relative movement of said mobile frame and said unitary structure.

20. In combination: a mobile frame including a transverse supporting axle structure mounting a pair of laterally spaced ground engaging wheels; a harvester attachment comprising an elongated supporting frame having front and rear detachable connections for supporting and suspending same from said mobile frame, said supporting frame extending along said mobile frame in generally parallel relation thereto and under said axle structure in the space between said wheels, comprising harvesting mechanism carried by a forward portion of said supporting frame and disposed generally in advance of said axle structure, comprising conveying means carried by said supporting frame extending therealong in generally parallel relation thereto for a major portion thereof and extending in coacting relation to said mechanism and under said axle structure in position to move harvested material rearwardly from said mechanism and beneath said axle structure, said connections including elements coacting with said mobile frame to provide pivot supports disposed intermediate the ends of said supporting frame and affording swinging movement thereof about a transverse axis disposed adjacent said axle structure, and comprising harvested material receiving means carried by said supporting frame and disposed to the rear of said transverse axis in generally underlying material receiving relation to the rear end of said conveying means; said supporting frame, harvesting mechanism, conveying means and harvested material receiving means constituting a bodily movable unitary base structure with the portions thereof in advance of said axle structure having an overall width and height respectively less than the lateral spacing of said wheels and the ground clearance afforded by said mobile frame and axle structure whereby when said unitary base structure is detached from said mobile frame and rests on the ground therebeneath said mobile frame may be propelled forwardly over and away from said unitary structure.

21. In combination: a mobile frame including a transverse supporting axle structure mounting a pair of laterally spaced ground engaging wheels; a harvester attachment comprising an elongated supporting frame having front and rear portions detachably interconnected to and suspended from said mobile frame in generally parallel relation thereto and under said axle structure in the space between said wheels, comprising harvesting mechanism carried by a forward portion of said supporting frame and disposed generally in advance of said axle structure, comprising conveying means carried by said supporting frame extending therealong in generally parallel relation thereto for a major portion thereof and extending therealong in coacting relation to said mechanism and under said axle structure in position to move harvested material rearwardly from said mechanism and beneath said axle structure, and comprising harvested material receiving means carried by said supporting frame and disposed to the rear of said axle structure in partially underlying relation to the rear end of said conveying means; said supporting frame, harvesting mechanism, conveying means and receiving means constituting a bodily movable unitary base structure with the portions thereof in advance of said axle structure having an overall width and height respectively less than the lateral spacing of said wheels and the ground clearance afforded by said mobile frame and axle structure whereby when said unitary base structure is detached from said mobile frame and rests on the ground therebeneath said mobile frame may be propelled forwardly over and away from said unitary structure.

22. In combination: a mobile frame including a transverse supporting axle structure mounting a pair of laterally spaced ground engaging wheels and including an operator's station disposed in adjacent overlying relation to said axle structure; a harvester attachment comprising an elongated supporting frame having front and rear portions detachably interconnected to and suspended from said mobile frame and extending along said mobile frame in generally parallel relation thereto and under said axle structure in the space between said wheels, comprising harvesting mechanism carried by a forward portion of said supporting frame and disposed generally in advance of said axle structure, comprising conveying means carried by said supporting frame extending therealong in generally parallel relation thereto for a major portion thereof and extending therealong in coacting relation to said mechanism and under said axle structure in position to move harvested material rearwardly from said mechanism and beneath said axle structure, and comprising harvested material receiving means carried by said supporting frame and disposed in partially underlying relation to the rear end of said conveying means, said receiving means including an elevating conveyer having its material receiving end supported for vertical swinging movement about a transverse pivot axis and being additionally supported by means of a pair of rods having their rear ends pivotally connected with a portion of said elevating conveyer remote from said material receiving end and having their forward ends pivotally detachably connected with portions of said mobile frame laterally adjacent opposite sides of said operator's station, said rods being swingable rearward relative to said elevating conveyer upon being detached from said mobile frame and into an underlying ground engaging supporting position with respect to said elevating conveyer; said supporting frame harvesting mechanism, conveying means and receiving means constituting a bodily movable unitary base structure with the portions thereof in advance of said axle structure having an overall width and height respectively less than the lateral spacing of said wheels and the ground clearance afforded by said mobile frame and axle structure whereby when said unitary base structure is detached from said mobile frame and rests on the ground therebeneath said mobile frame may be propelled forwardly over and away from said unitary structure.

23. In combination: a mobile frame including a transverse axle structure mounting a pair of laterally spaced ground engaging wheels; a harvester attachment comprising an elongated supporting frame having front and rear portions detachably interconnected to and suspended from said mobile frame and extending along said mobile frame in generally parallel relation thereto and under said axle structure in the space between said wheels, comprising harvesting mechanism carried by a forward portion of said supporting frame and disposed generally in advance of said axle structure, and comprising conveying means carried by said supporting frame extending therealong in generally parallel relation thereto for a major portion thereof and extending therealong in coacting relation to said mechanism and under said axle structure in position to move harvested material rearwardly from said mechanism and beneath said axle structure, said harvesting mechanism comprising cooperative ear husking roll sections disposed in immediate forward relation to said axle structure and cooperative ear snapping roll sections disposed in immediate forward relation to said husking sections; said elongated frame, harvesting mechanism and conveying means constituting a bodily movable unitary base structure having an overall width and height respectively less than the lateral spacing of said wheels and the ground clearance afforded by said mobile frame and axle structure whereby when said unitary base structure is detached from said mobile frame and rests on the ground therebeneath said mobile frame may be propelled over and away from said unitary structure.

24. In combination: a mobile frame including a transverse supporting axle structure mounting a pair of laterally spaced ground engaging wheels; a harvester attachment comprising an elongated supporting frame having front and rear portions detachably interconnected to and suspended from said mobile frame and extending along said mobile frame in generally parallel relation thereto and under said axle structure in the space between said wheels, comprising harvesting mechanism carried by a forward portion of said supporting frame and disposed generally in advance of said axle structure, and comprising conveying means carried by said supporting frame extending therealong in generally parallel relation thereto for a major portion thereof and extending therealong in coacting relation to said mechanism and under said axle structure in position to move harvested material rearwardly from said mechanism and beneath said axle structure, said harvesting mechanism comprising a pair of cooperative rolls mounted to extend forward and downward relative to said mobile frame from a point adjacent said axle structure with said conveying means disposed in rearward continuing relation with respect to the material supporting surface afforded by the upper rear end portion of said rolls; said elongated frame, harvesting mechanism and conveying means constituting a bodily movable unitary base structure having an overall width and height respectively less than the lateral spacing of said wheels and the ground clearance afforded by said mobile frame and axle structure whereby when said unitary base structure is detached from said mobile frame and rests on the ground therebeneath said mobile frame may be propelled over and away from said unitary structure.

25. In combination: a mobile frame including a transverse supporting axle structure mounting a pair of laterally spaced ground engaging wheels; a harvester attachment comprising an elongated supporting frame having front and rear portions detachably interconnected to and suspended from said mobile frame and extending along said mobile frame in generally parallel relation thereto and under said axle structure in the space between said wheels, comprising harvesting mechanism carried by a forward portion of said supporting frame and disposed generally in advance of said axle structure, and comprising conveying means carried by said supporting frame extending therealong in generally parallel relation thereto for a major portion thereof and extending therealong in coacting relation to said mechanism and under said axle structure in position to move harvested material rearwardly from said mechanism and beneath said axle structure, said supporting frame presenting a portion in advance of said axle structure which slopes forwardly downward relative to said mobile frame, said harvesting mechanism comprising a pair of cooperative side opposed rolls mounted on said forwardly downward sloping portion of said elongated frame in underlying relation thereto; said supporting frame, harvesting mechanism and conveying means constituting a bodily movable unitary base structure having an overall width and height respectively less than the lateral spacing of said wheels and the ground clearance afforded by said mobile frame and axle structure whereby when said unitary base structure is detached from said mobile frame and rests on the ground therebeneath said mobile frame may be propelled over and away from said unitary structure.

26. In combination: a mobile frame including a transverse supporting axle structure mounting a pair of laterally spaced ground engaging wheels; a corn harvester comprising an elongated supporting frame having front and rear portions detachably interconnected to and suspended from said mobile frame and extending along said mobile frame in generally parallel relation thereto and under said axle structure in the space between said wheels, comprising a material confining trough structure carried by a rear portion of said supporting frame and extending forwardly therealong below said axle structure, comprising cooperative harvesting rolls mounted on said supporting frame and extending forwardly therealong in downward continuing relation with respect to the material supporting surface afforded by the forward end of the bottom portion of said trough structure, and comprising conveying means carried by said supporting frame to extend therealong in overlying relation to at least one of said rolls, through said trough structure and to a point of discharge at the rear of said axle structure; said supporting frame, trough structure, harvesting rolls and conveying means constituting a bodily movable unitary corn harvester structure having an overall width and height respectively less than the lateral spacing of said wheels and the ground clearance afforded by said mobile frame and axle structure whereby when said unitary corn harvester is detached from said mobile frame and rests on the ground therebeneath said mobile frame may be propelled over and away from said unitary corn harvester, said supporting frame presenting a portion in advance of said axle structure sloping forwardly downward relative to said mobile frame, said rolls being disposed in underlying relation to said forwardly downward sloping portion of said supporting frame.

27. In combination: a mobile frame including a transverse supporting axle structure mounting a pair of laterally spaced ground engaging wheels; a corn harvester comprising an elongated supporting frame having front and rear portions detachably interconnected to and suspended from said mobile frame and extending along said mobile frame in generally parallel relation thereto and under said axle structure in the space between said wheels, comprising a material confining trough structure carried by a rear portion of said supporting frame and extending forwardly therealong below said axle structure, comprising cooperative harvesting rolls mounted on said supporting frame and extending forwardly therealong in downward continuing relation with respect to the material supporting surface afforded by the forward end of the bottom portion of said trough structure, and comprising conveying means carried by said supporting frame to extend therealong in overlying relation to at least one of said rolls, through said trough structure and to a point of discharge at the rear of said axle structure; said supporting frame, trough structure, harvesting rolls and conveying means constituting a bodily movable unitary corn harvester structure having an overall width and height respectively less than the lateral spacing of said wheels and the ground clearance afforded by said mobile frame and axle structure whereby when said unitary corn harvester structure is detached from said mobile frame and rests on the ground therebeneath said mobile frame may be propelled over and away from said corn harvester, said conveying means including a stalk gathering portion and comprising a single endless device having an active course operatively traveling along said rolls, through said trough structure and to a point of discharge at the rear of said axle structure.

28. In combination: a mobile frame including a transverse supporting axle structure mounting a pair of laterally spaced ground engaging wheels; a harvester attachment comprising an elongated supporting frame having front and rear portions detachably interconnected to and suspended from said mobile frame and extending along said mobile frame in generally parallel relation thereto and under said axle structure in the space between said wheels, comprising harvesting mechanism carried by a forward portion of said supporting frame and disposed generally in advance of said axle structure, and comprising conveying means carried by said supporting frame to extend therealong in generally parallel relation thereto for a major portion thereof and extending therealong in coacting relation to said mechanism and under said axle structure in position to move harvested material rearwardly from said mechanism and beneath said axle structure, said supporting frame, harvesting mechanism and conveying means constituting a bodily movable unitary base structure having an overall width and height respectively less than the lateral spacing of said wheels and the ground clearance afforded by said mobile frame and axle structure whereby when said unitary base structure is detached from said mobile frame and rests on the ground therebeneath said mobile frame may be propelled over and away from said unitary structure, said harvesting mechanism comprising a pair of cooperative rolls extending forwardly downward relative to said mobile frame, said conveying means including a stalk gathering portion and comprising a single endless device having an active course operatively traveling along said rolls and rearwardly therebeyond and under said axle structure to a point of discharge at the rear thereof.

29. In combination: a mobile frame including a transverse supporting axle structure mounting a pair of laterally spaced ground engaging wheels; a harvester attachment comprising an elongated supporting frame having front and rear portions detachably interconnected to and suspended from said mobile frame and extending along said mobile frame in generally parallel relation thereto and under said axle structure in the space between said wheels, comprising harvesting mechanism carried by a forward portion of said supporting frame and disposed generally in advance of said axle structure, and comprising conveying means carried by said supporting frame extending therealong in generally parallel relation thereto for a major portion thereof and extending therealong in coacting relation to said mechanism and under said axle structure in position to move harvested material rearwardly from said mechanism and beneath said axle structure; said supporting frame, harvesting mechanism and conveying means constituting a bodily movable unitary base structure having an overall width and height respectively less than the lateral spacing of said wheels and the ground clearance afforded by said mobile frame and axle structure whereby when said unitary base structure is detached from said mobile frame and rests on the ground therebeneath said mobile frame may be propelled over and away from said unitary structure, said harvesting mechanism comprising a pair of cooperative rolls with the lengthwise axis of the outer roll being higher than the corresponding axis of the inner roll, said rolls extending forwardly downward relative to said mobile frame, said conveying means including a stalk gathering portion and comprising an endless device having an active course operatively traveling over and along said inner roll and rearwardly therebeyond and under said axle structure to a point of discharge at the rear thereof.

30. In combination: a mobile frame including a transverse supporting axle structure mounting a pair of laterally spaced ground engaging wheels; a harvester attachment comprising an elongated supporting frame having front and rear portions detachably interconnected to and suspended from said mobile frame and extending along said mobile frame in generally parallel relation thereto and under said axle structure in the space between said wheels, comprising harvesting mechanism carried by a forward portion of said supporting frame and disposed generally in advance of said axle structure, and comprising conveying means carried by said supporting frame extending therealong in generally parallel relation thereto for a major portion thereof and extending therealong in coacting relation to said mechanism and under said axle structure in position to move harvested material rearwardly from said mechanism and beneath said axle structure; said supporting frame, harvesting mechanism and conveying means constituting a bodily movable unitary base structure having an overall width and height respectively less than the lateral spacing of said wheels and the ground clearance afforded by said mobile frame and axle structure whereby when said unitary base structure is detached from said mobile frame and rests on the ground therebeneath said mobile frame may be propelled over and away from said unitary structure, said harvesting mechanism comprising a pair of cooperative rolls with the lengthwise axis of the outer roll being substantially higher than the lengthwise axis of the inner roll, said rolls extending forwardly downward relative to said mobile frame and including front snapping sections and husking sections to the rear of and axially aligned with said snapping sections, and comprising spaced edge-opposed stripper plates overlying said snapping section, said conveying means including a stalk gathering portion and comprising a single endless device having an active course operatively traveling over the stripper plate overlying said inner roll, over and along the husking section of said inner roll and rearwardly beyond and under said axle structure to a point of discharge at the rear thereof.

31. In combination: a mobile frame including a transverse supporting axle structure mounting a pair of laterally spaced ground engaging wheels and including a power source having a power take-off element; a harvester attachment comprising an elongated supporting frame having front and rear portions detachably interconnected to and suspended from said mobile frame and extending along said mobile frame in generally parallel relation thereto and under said axle structure in the space between said wheels, comprising harvesting mechanism carried by a forward portion of said supporting frame and disposed generally in advance of said axle structure, comprising conveying means carried by said supporting frame extending therealong in generally parallel relation thereto for a major portion thereof and extending therealong in coacting relation to said mechanism and under said axle structure in position to move harvested material rearwardly from said mechanism and beneath said axle structure, and comprising a power transmitting mechanism mounted on said supporting frame and being normally operatively connected with said harvesting mechanism and said conveying means, said power transmitting mechanism presenting a power input element positioned in attaching relation adjacent said power take-off element when said supporting frame is attached to said mobile frame; said supporting frame, harvesting mechanism, conveying means and power transmitting mechanism constituting a bodily movable unitary base structure with the portion thereof forward of said axle structure having an overall width and height respectively less than the lateral spacing of said wheels and the ground clearance afforded by said mobile frame and axle structure whereby when said unitary base structure is detached from said mobile frame and rests on the ground therebeneath said mobile frame may be propelled forwardly over and away from said unitary structure.

32. In combination: a mobile frame including a transverse supporting axle structure mounting a pair of laterally spaced ground engaging wheels and including a power source having a rearwardly projecting power take-off shaft disposed adjacent said axle structure, a harvester attachment comprising an elongated supporting frame having front and rear portions detachably interconnected to and suspended from said mobile frame and extending along said mobile frame in generally parallel relation thereto and under said axle structure in the space between said wheels, comprising harvesting mechanism carried by a forward portion of said supporting frame and disposed generally in advance of said axle structure, comprising conveying means carried by said supporting frame extending therealong in generally parallel relation thereto for a major portion thereof and extending therealong in coacting relation to said mechanism and under said axle structure in position to move harvested material rearwardly from said mechanism and beneath said axle structure, and comprising a power transmitting mechanism mounted on a rear portion of said supporting frame and disposed to the rear of said axle structure and being normally operatively connected to said harvesting mechanism and conveying means, said power transmitting mechanism presenting a forwardly projecting power input shaft detachably connected with said power take-off shaft; said supporting frame, harvesting mechanism, conveying means and power transmitting mechanism constituting a bodily movable unitary base structure with the portion thereof forward of said housing having an overall width and height respectively less than the lateral spacing of said wheels and the ground clearance afforded by said mobile frame and axle structure whereby when said unitary base structure is detached from said mobile frame and rests on the ground therebeneath said mobile frame may be propelled forwardly over and away from said unitary structure.

33. In combination: a mobile frame including a transverse supporting axle structure mounting a pair of laterally spaced ground engaging wheels and mounting a power source having a power take-off shaft; a harvester attachment comprising an elongated supporting frame provided with front and rear connections interconnecting and suspending same from said mobile frame, said supporting frame extending along said mobile frame in generally parallel relation thereto and under said axle structure in the space between said wheels, comprising harvesting mechanism carried by a forward portion of said supporting frame and disposed generally in advance of said axle structure, comprising conveying means carried by said supporting frame extending therealong in generally parallel relation thereto for a major portion thereof and extending therealong in coacting relation to said mechanism and under said axle structure in position to move harvested material rearwardly from said mechanism and beneath said axle structure, said connections including elements coacting with said mobile frame providing a rear pivot support affording vertical swinging movement of said supporting frame about a transverse axis disposed adjacent said axle structure, and comprising a power transmitting mechanism mounted on said support frame to the rear of said transverse axis and being normally operatively connected with said harvesting mechanism and conveying means, said power transmitting mechanism presenting a forwardly extending power input shaft detachably connected with said power take-off shaft; said supporting frame, harvesting mechanism, conveying means and power transmitting mechanism constituting a unitary base structure with the portion thereof forward of said axis having an overall width and height respectively less than the lateral spacing of said wheels and the ground clearance afforded by said mobile frame and axle structure whereby when said unitary base structure is detached from said mobile frame and rests on the ground therebeneath said mobile frame may be propelled forwardly over and away from said unitary structure.

34. In combination: a mobile frame including a transverse supporting axle structure mounting a pair of laterally spaced ground engaging wheels and mounting a power source having a power take-off shaft; a harvester attachment comprising an elongated supporting frame having front and rear portions detachably interconnected to and suspended from said mobile frame and extending along said mobile frame in generally parallel relation thereto and under said axle structure in the space between said wheels, comprising harvesting mechanism carried by a forward portion of said supporting frame and disposed generally in advance of said axle structure, comprising conveying means carried by said supporting frame extending therealong in generally parallel relation thereto for a major portion thereof and extending therealong in coacting relation to said mechanism and under said axle structure in position to move harvested material rearwardly from said mechanism and beneath said axle structure, and comprising a power transmitting mechanism mounted on said supporting frame and disposed to the rear of said axle structure, said power mechanism being normally operatively connected with said harvesting mechanism and conveying means and including a power input shaft detachably connected with said power take-off shaft, said conveying means extending over said power transmitting mechanism to a point of discharge at the rear thereof; said supporting frame, harvesting mechanism, conveying means and power transmitting mechanism constituting a unitary base structure having an overall width and height respectively less than the lateral spacing of said wheels and the ground clearance afforded by said mobile frame and axle structure such that when said unitary structure is detached from said mobile frame and rests on the ground therebeneath said mobile frame may be propelled over and away from said unitary structure.

35. In combination: a mobile frame including a transverse supporting axle structure mounting a pair of laterally spaced ground engaging wheels and including a power source having a rearwardly projecting power take-off shaft disposed adjacent said axle structure; a corn harvester comprising an elongated supporting frame having front and rear portions detachably interconnected to and suspended from said mobile frame and extending along said mobile frame in generally parallel relation thereto and under said axle structure in the space between said wheels, comprising a material confining trough structure carried by a rear portion of said supporting frame and extending forwardly therealong below said axle structure, comprising cooperative harvesting rolls mounted on said supporting frame and extending forwardly therealong in downward continuing relation with respect to the material supporting surface afforded by the forward end of the bottom portion of said trough structure, comprising conveying means carried by said supporting frame to extend therealong in overlying relation to at least one of said rolls, through said trough structure and to a point of discharge at the rear of said axle structure, and comprising a power transmitting mechanism mounted on said supporting frame and enclosed in an elongated housing disposed to the rear of said axle structure in transverse underlying relation to said trough structure, said power transmitting mechanism being normally operatively connected with said harvesting mechanism and conveying means and including a forwardly projecting power input shaft presenting an exposed portion detachably connected with said power take-off shaft; said supporting frame, trough structure, harvesting rolls, conveying means and power transmitting mechanism constituting a bodily movable unitary corn harvester structure having an overall width and height respectively less than the lateral spacing of said wheels and the ground clearance afforded by said mobile frame and axle structure whereby when said unitary corn harvester is detached from said mobile frame and rests on the ground therebeneath said mobile frame may be propelled over and away from said unitary corn harvester.

RECTOR C. FERGASON.

References Cited in the file of this patent

UNITED STATES PATENTS

| Number | Name | Date |
|---|---|---|
| 322,459 | Lewis et al. | July 21, 1885 |
| 357,102 | Savage | Feb. 1, 1887 |
| 364,036 | Olin | May 31, 1887 |
| 610,069 | Le Blanc | Aug. 30, 1898 |
| 641,320 | Parrish | Jan. 16, 1900 |
| 833,190 | Williams | Oct. 16, 1906 |
| 1,793,692 | Groves | Feb. 24, 1931 |
| 1,943,284 | Binau | Jan. 16, 1934 |
| 1,978,968 | Steel | Oct. 30, 1934 |
| 2,133,905 | Rund, Jr. | Oct. 18, 1938 |
| 2,205,707 | Woodring, Jr. | June 25, 1940 |
| 2,222,116 | Mott | Nov. 19, 1940 |
| 2,223,704 | Powell | Dec. 3, 1940 |
| 2,238,247 | Coldwill | Apr. 15, 1941 |
| 2,259,892 | Hyman | Oct. 21, 1941 |
| 2,259,893 | Hyman | Oct. 21, 1941 |
| 2,293,757 | Jochumsen | Aug. 25, 1942 |
| 2,320,135 | Hyman | May 25, 1943 |
| 2,458,782 | Hyman et al. | Jan. 11, 1949 |